(12) United States Patent
Harada et al.

(10) Patent No.: US 7,903,203 B2
(45) Date of Patent: Mar. 8, 2011

(54) LIQUID CRYSTAL DISPLAY ELEMENT AND MANUFACTURING METHOD THEREOF

(75) Inventors: Haruo Harada, Ebina (JP); Hiroshi Arisawa, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 671 days.

(21) Appl. No.: 11/979,924

(22) Filed: Nov. 9, 2007

(65) Prior Publication Data
US 2008/0117380 A1 May 22, 2008

Related U.S. Application Data

(62) Division of application No. 10/939,486, filed on Sep. 14, 2004, now abandoned.

(30) Foreign Application Priority Data

Mar. 15, 2004 (JP) .................................. 2004-072928

(51) Int. Cl.
G02F 1/1333 (2006.01)
(52) U.S. Cl. .......................................................... 349/92
(58) Field of Classification Search ............... 349/92–93
See application file for complete search history.

(56) References Cited

U.S. PATENT DOCUMENTS

| 4,435,047 A | 3/1984 | Fergason |
| 5,082,351 A | 1/1992 | Fergason |
| 5,309,262 A | 5/1994 | Haas |
| 6,392,725 B1 | 5/2002 | Harada et al. |
| 6,618,105 B2 * | 9/2003 | Yamazaki et al. ............. 349/86 |
| 2002/0109807 A1 | 8/2002 | Freeman |

FOREIGN PATENT DOCUMENTS

| JP | A-64-55568 | 3/1989 |
| JP | A-9-90321 | 4/1997 |
| JP | A-9-236791 | 9/1997 |
| JP | A-2001-75083 | 3/2001 |
| JP | A-2002-90716 | 3/2002 |
| JP | A-2002-270495 | 9/2002 |
| JP | A-2002-346466 | 12/2002 |

OTHER PUBLICATIONS

Aug. 3, 2010 Japanese Office Action issued in Japanese Patent Application No. 2004-072928 (with translation).

\* cited by examiner

*Primary Examiner* — James A Dudek
(74) *Attorney, Agent, or Firm* — Oliff & Berridge, PLC

(57) ABSTRACT

The invention discloses a liquid crystal display element including: a pair of display substrates each having a support and an electrode provided on one surface of the support; and a display layer provided between the electrodes of the pair of display substrates, wherein the display layer contains gelatin and liquid crystal drops or microcapsules; and the liquid crystal drops or microcapsules are densely arrayed in a monolayer, and a method of manufacturing the liquid crystal display element, including: applying to a surface of one of the display substrates which surface has the electrode, a coating solution in which liquid crystal drops or microcapsules are dispersed in a solution containing gelatin and a solvent, thereby forming a coating layer; and evaporating the solvent in the coating layer at a temperature not less than the freezing point of the gelatin to provide a display layer between the electrodes of the display substrates.

7 Claims, 16 Drawing Sheets

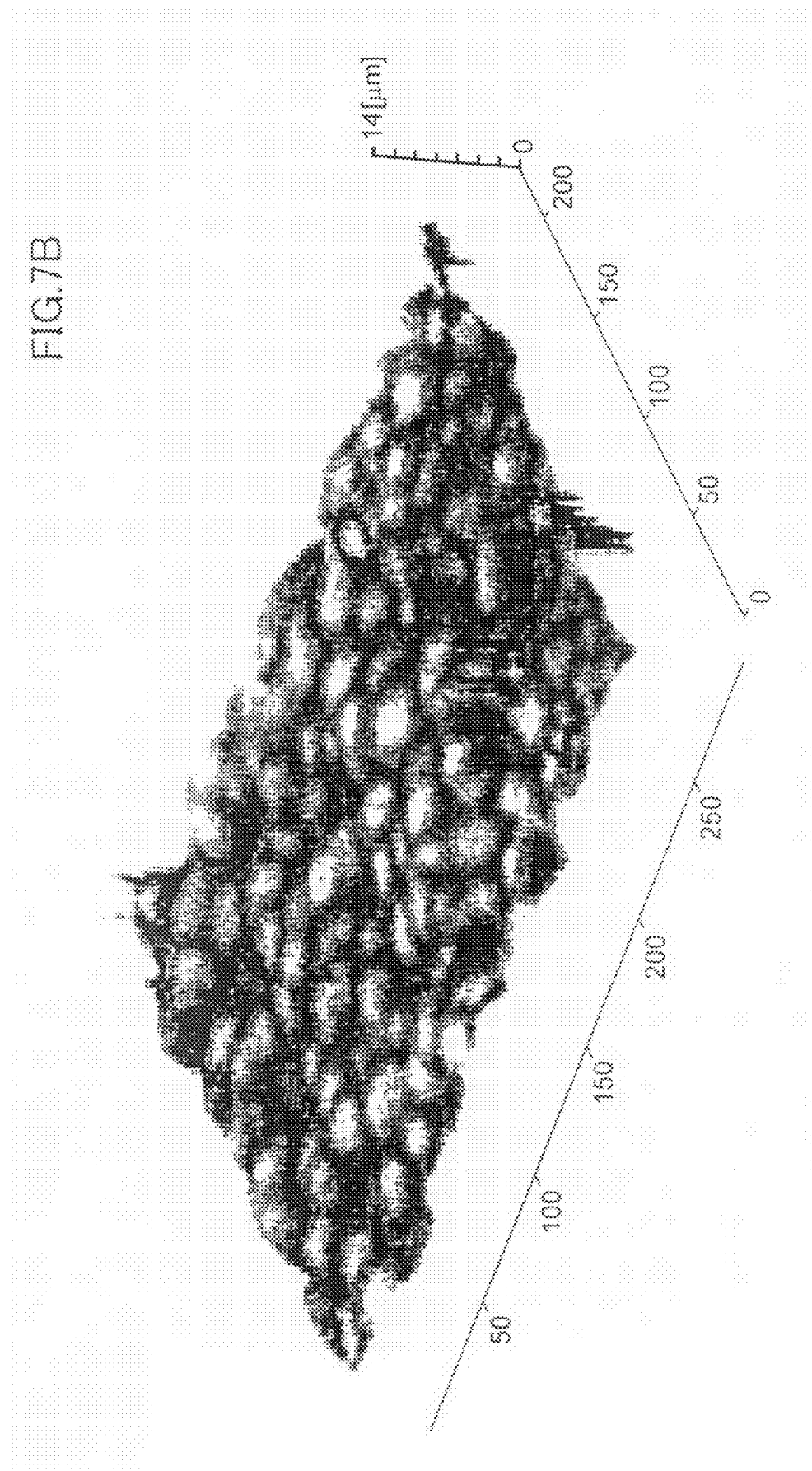

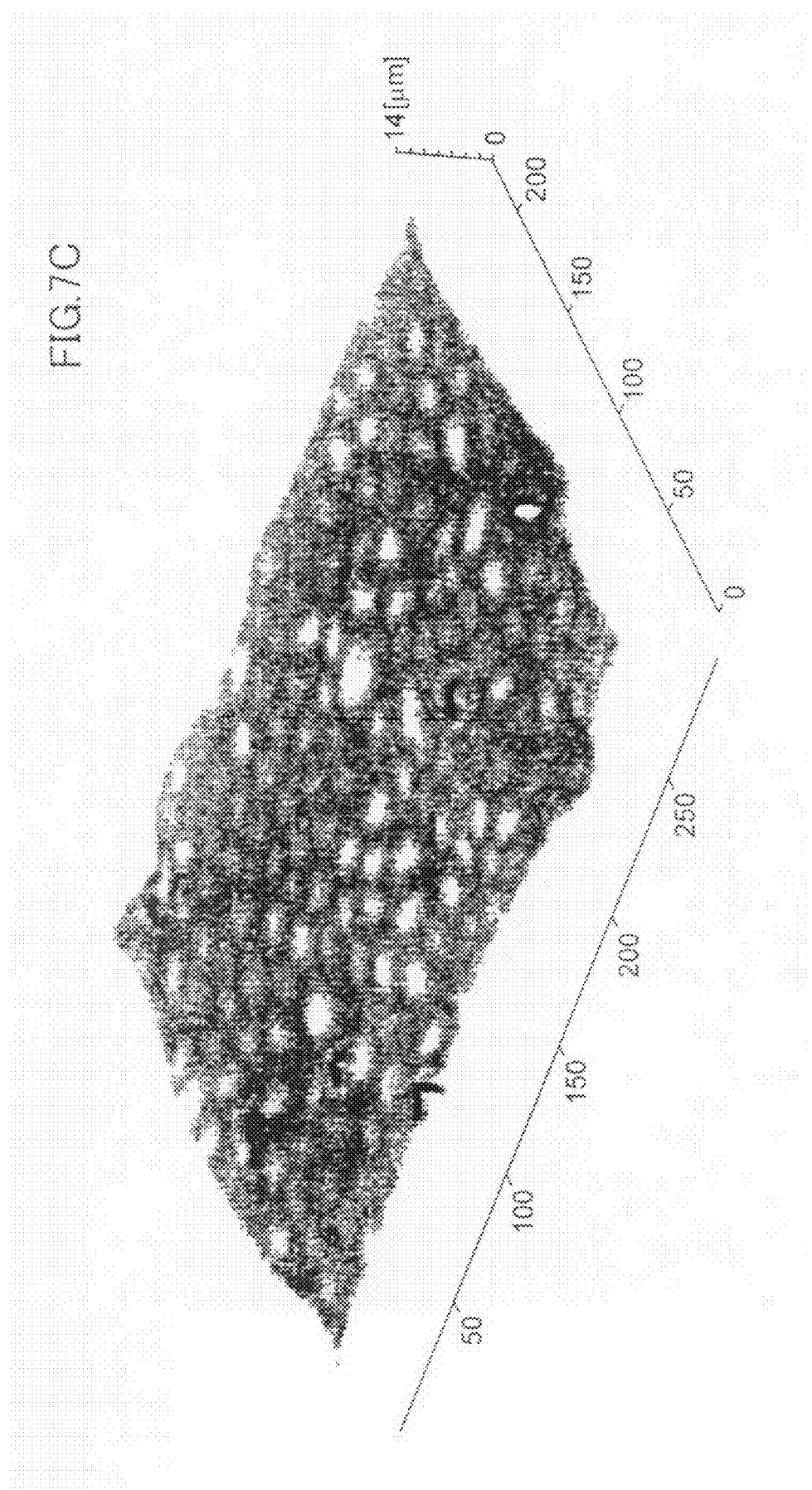

LIQUID CRYSTAL DISPLAY ELEMENT AND MANUFACTURING METHOD THEREOF

CROSS-REFERENCE TO RELATED APPLICATION

This is a divisional of application Ser. No. 10/939,486 filed Sep. 14, 2004 which is hereby incorporated in its entirety herein. This application claims priority under 35 USC 119 from Japanese Patent Application No. 2004-72928, the disclosure of which is incorporated by reference herein.

BACKGROUND OF THE INVENTION

1. Field of the Invention

The present invention relates to a liquid crystal display element having a display layer including liquid crystal drops or liquid crystal microcapsules, and a manufacturing method thereof.

2. Description of the Related Art

The large quantity of paper consumed mainly in offices has become problematic, owing to both the destruction of forest resources to obtain the raw material for paper pulp as well as environmental pollution arising from the disposal and incineration of refuse. However, consumption of paper meant to be short-lived documentation for temporary viewing of electronic information has tended to increase more and more with the spread of personal computers and the development of information-based society, as with the Internet. It is therefore desirable that a rewritable display medium be developed to replace paper.

In recent years, cholesteric liquid crystal display elements have been notable for such merits as a memory property capable of retaining the display without a power source, a bright display gained from non-use of a polarizing plate, and color display being possible even without use of a color filter.

Cholesteric liquid crystal, in which liquid crystal molecules have a helical structure, causes a selective reflection phenomenon where incident light is divided into right-hand circularly polarized light and left-hand circularly polarized light, and a circularly polarized light component corresponding to the torsional direction of the helix undergoes Bragg reflection, and the rest of the light is transmitted. The central wavelength $\lambda$ and the reflected wavelength width $\Delta\lambda$ of reflected light are denoted as $\lambda=n \cdot p$ and $\Delta\lambda=\Delta n \cdot p$ respectively where helical pitch is p, average refractive index is n and double refractive index is $\Delta n$, and reflected light from a cholesteric liquid crystal layer exhibits vibrant color depending on the helical pitch.

Cholesteric liquid crystal having positive dielectric anisotropy can exist in the following three states: a planar state where the helical axis is perpendicular to a cell surface as shown in FIG. 10A and the above-mentioned selective reflection phenomenon is caused with respect to incident light, a focal conic state where the helical axis is substantially parallel to the cell surface as shown in FIG. 10B and incident light is transmitted while being somewhat subjected to forward scattering, and a homeotropic state where a liquid crystal director turns in the direction of an electric field with a deformed helical structure as shown in FIG. 10C and where incident light is transmitted substantially completely.

Of the three states, the planar state and the focal conic state can bistably exist without voltage. The state of orientation of cholesteric liquid crystal, therefore, is not univocally determined for voltage applied to a liquid crystal layer, the state of orientation of which changes from a planar state to a focal conic state and then to a homeotropic state, in that order, as an applied voltage is increased in a case where the planar state is the initial state, and changes from a focal conic state to a homeotropic state, in that order, as an applied voltage is increased in a case where the focal conic state is the initial state. On the other hand, in a case where voltage applied to a liquid crystal layer is abruptly brought to 0, the planar state and the focal conic state are maintained in these respective states, while the homeotropic state changes into the planar state. The three states can be made to undergo mutual transition by the magnitude of applied pulse voltage.

FIG. 11 shows this electrooptical response. In FIG. 11, the curve A denotes the case where the initial state is the planar state and the curve B denotes the case where the initial state is the focal conic state.

A range denoted as (a) in FIG. 11 shows the planar state or the focal conic state (selective reflection state or transmission state), a range denoted as (b) shows a transition region, a range denoted as (c) shows the focal conic state (transmission state), a range denoted as (d) shows a transition region and a range denoted as (e) shows the homeotropic state, which changes into the planar state (selective reflection state) at a voltage of 0. Vpf,90, Vpf,10, Vfh,10 and Vh,90 signify voltage at which normalized reflectance is 90 or 10 (normalized reflectance of 90 or more is regarded as the selective reflection state and that of 10 or less is regarded as the transmission state) before and after the two transition regions.

A layer for absorbing light of the same wavelength as at least the selective reflection color is disposed on the back of a cholesteric liquid crystal layer, so that a reflection type memory display utilizing the planar state and the focal conic state can be achieved.

A cholesteric liquid crystal display element can have a structure in which liquid crystal is contained in space formed between a pair of display substrates to form a continuous phase, or have a structure such as a PDLC (Polymer Dispersed Liquid Crystal) structure in which drop-like cholesteric liquid crystal is dispersed in a polymeric binder or a PDMLC (Polymer Dispersed Microencapsulated Liquid Crystal) structure in which microencapsulated cholesteric liquid crystal is dispersed in a polymeric binder (for example, refer to Japanese Patent Application Publication (JP-B) No. 7-009512, Japanese Patent Application Laid-Open (JP-A) No. 09-236791 and Japanese Patent No. 3178530 (paragraphs 0159 to 0161)).

The use of the PDLC or PDMLC structure restrains the flowability of liquid crystal, and thus disorder of an image due to bending and pressure decreases, achieving a flexible medium. The direct laminating of multiple cholesteric liquid crystal layers allows realization of color display, and also laminating with a photoconductive layer allows realization of a display element for addressing an image with light signals. In addition, a display layer can be formed with a thick-film printing technique so as to offer the advantage of the manufacturing method thereof being simplified to achieve low cost.

However, a cholesteric liquid crystal display element having a PDLC or PDMLC structure has problems in that selective reflection color in the planar state is low in brightness and color purity so as not to allow a clear color display, and that light transmittance in the focal conic state is poor such that contrast decreases due to a turbid black display in a display element provided with a black light-absorbing layer on the back thereof.

The reason why selective reflection color in the planar state is low in brightness as described above is that, as shown in FIG. 12, an area 32y of disordered orientation occurs in the vicinity of an interface of each liquid crystal drop or liquid crystal microcapsule 32 which has a curved surface such as being in a spherical shape, and an effective selective reflection area 32x reduces in the planar state. This also results in unnecessary scattered light in the focal conic state. An effective means for reducing this defect is to render the diameters of the liquid crystal drops larger and uniform and to decrease the total area of interfaces as much as possible. However, the problem arises of surface irregularities of a display layer becoming large due to the enlarged liquid crystal drops as described below.

As shown in FIGS. 13 and 14, conventional structures including PDLC and PDMLC are manufactured by applying a coating solution for a display layer to a display substrate 10 with a coating device 60 (FIGS. 13A and 14A), evaporating a solvent 35 by heating and decompressing (FIGS. 13B and 14B). Within the coating solution, the liquid crystal drops or the liquid crystal microcapsules 32 are dispersed in an aqueous solution of a polymer serving as a binder. Refer to JP-B No. 7-009512, JP-A No. 09-236791 and Japanese Patent No. 3178530 (paragraphs 0159 to 0161)). FIG. 13 shows an example of polydispersion where the liquid crystal drops or the liquid crystal microcapsules are not uniform in particle diameter, while FIG. 14 shows an example of monodispersion where the particle diameters are uniform.

In the case of FIG. 13, when the concentration of nonvolatile components (non-evaporable components) in a coating film is increased by evaporating the solvent, the flowability of a coating layer decreases, causing a phenomenon called flocculation where multiple liquid crystal drops or liquid crystal microcapsules flow integrally, as shown by 33 in FIG. 13B. Drying progresses in a state where individual dispersed liquid crystal drops cannot freely move, and thus the obtained display layer has a structure in which multiple liquid crystal drops or liquid crystal microcapsules are in an accumulated state, and additionally, a leveling effect on the liquid surface does not sufficiently come to bear, whereby a film is produced which easily obtains large surface irregularities in the liquid crystal drop layer, causing a particular disadvantage which will be mentioned later.

The flocculation also occurs in a case where the liquid crystal drops 32 dispersed as shown in FIG. 14 have uniform and large particle diameters. The larger and more uniform the particle diameters are of the dispersed liquid crystal drops, the greater the tendency is for surface irregularities to become large in a liquid crystal drop layer.

When surface irregularities in the liquid crystal drop layer are large, as shown in FIG. 15, a bonding layer 16 cannot completely cover all of the irregularities and an undesirable air layer 38 occurs between the bonding layer 16 and a display layer 30 at the time that opposite display substrates 10 and 20 are laminated. A desirable voltage cannot be applied to areas including air. The areas thus remain in the planar state which is obtained after coating, do not act and cause unnecessary selective reflection light. Light reflected at the interface between the bonding layer 16 and the air layer 38, or between the air layer 38 and the display layer 30, becomes unnecessary backward scattered light, which particularly causes decrease in light transmittance in the focal conic state and a turbid black display as described above.

In addition, the reason why color purity is low in conventional PDLC and PDMLC structures is as follow. As shown in FIGS. 13 to 15, light which has passed through cholesteric liquid crystal is slightly forward scattered when liquid crystal drops are not orderly arrayed in a monolayer. The forward scattered light enters a second liquid crystal drop layer at a smaller incident angle. A phenomenon where the liquid crystal drops in second or more layers reflect light of a shorter wavelength than the original helical pitch according to Bragg's condition ($\lambda = n \cdot P \cdot \cos \theta$) in addition to the original selective reflection light undesirably occurs in a state of liquid crystal drops being accumulated in the direction of thickness, decreasing the color purity of reflection color observed as a result.

Problems have been described so far with regard to a cholesteric liquid crystal display element. Also with regard to the display element of a PDLC or PDMLC structure using nematic liquid crystal or guest-host liquid crystal, when the liquid crystal drops are not orderly arrayed in a monolayer, there is occasionally a problem of large surface irregularities in a liquid crystal drop layer causing incorporation of air at the time that opposite substrates are laminated, and of a varying abundance ratio of liquid crystal to a polymeric binder in the direction of thickness deteriorating threshold steepness.

JP-A No. 09-90321 describes a method in which liquid crystal microcapsules of a uniform size formed from liquid crystal drops coated with a medium having a constant thickness are formed into a monolayer. This method involves immersing a substrate in an emulsion in which liquid crystal microcapsules are dispersed, and pulling the substrate up from the emulsion at a constant velocity to form the monolayer on the substrate.

This method, however, employs the flow accumulation principle where a substrate is pulled out of an emulsion, and according to the wettability of the substrate surface, particles accumulate where the substrate, solution, and air are in contact due to tension acting between the particles partially immersed in the solution. Therefore, the film-forming rate is low, and the method requires much time. Consequently this method is not suitable for manufacturing a large surface-area device. In addition, a complicated mechanism is required, such as a feedback device for controlling the pull-up rate while observing the state of the coating film. Moreover, a process of applying a polymer solution after forming the monolayer is additionally required to flatten the surface of the coating film.

JP-A No. 2002-270495 describes a leveling method at the time that a coating solution is applied to a semiconductor wafer. With this leveling method, a coating solution applied to a semiconductor wafer is spread by a traveling wave that is generated by a traveling-wave generator (a piezoelectric element). The coating solution is spread within an environment where the atmosphere is pressurized to be equal to or more than the saturation vapor pressure of the coating solution so that no solvent vaporizes and thereby leveling is effectively performed. JP-A No. 2002-270495, however, gives no disclosure that liquid crystal drops or liquid crystal microcapsules, obtained from a coating solution containing particulates such as liquid crystal drops or liquid crystal microcapsules, are arrayed in a monolayer.

Accordingly, the invention has been made in view of the above-mentioned problems and there are needs for a liquid crystal display element that is superior in contrast, by forming a flat film in which liquid crystal drops or liquid crystal microcapsules are densely arrayed in a monolayer, and for a method of simply manufacturing such a liquid crystal display element with a large surface area.

SUMMARY OF THE INVENTION

The above-mentioned needs are met by providing the following liquid crystal display element and manufacturing method thereof.

A first aspect of the present invention provides a liquid crystal display element including: a pair of display substrates each having a support and an electrode provided on one surface of the support; and a display layer provided between the electrodes of the pair of display substrates, wherein the display layer contains gelatin and liquid crystal drops or liquid crystal microcapsules; and the liquid crystal drops or the liquid crystal microcapsules are densely arrayed in a monolayer.

A second aspect of the invention provides a method of manufacturing the liquid crystal display element, including: applying to a surface of one of display substrates each having a support and an electrode provided on one surface of the support, which surface has the electrode, a coating solution for a display layer in which liquid crystal drops or liquid crystal microcapsules are dispersed in a solution containing gelatin and a solvent, the gelatin, the solvent, and the liquid crystal drops or the liquid crystal microcapsules being in an adjusted mix proportion, thereby forming a coating layer; and evaporating the solvent in the coating layer at a temperature equal to or higher than the freezing point of the gelatin to provide a display layer between the electrodes of the display substrates.

With regard to the liquid crystal display element of the invention, monodispersed liquid crystal drops or liquid crystal microcapsules are densely arrayed in a monolayer and the surface of the display layer is flat, whereby the problem can be avoided which arises in a case where polydispersed liquid crystal drops or liquid crystal microcapsules conventionally having a curved interface such as a spherical or elliptical shape are arrayed in multilayers and surface irregularities of a display layer are large. That is, the use of cholesteric liquid crystal as the liquid crystal allows a liquid crystal display element where the effective selective reflection area within liquid crystal drops or liquid crystal microcapsules is large (selective reflection color is bright), the color purity of reflection color does not decrease, unnecessary selective reflection does not occur, and a superior display is enabled that does not suffer from a turbid black display. The use of nematic liquid crystal and guest-host liquid crystal as the liquid crystal allows a liquid crystal display element having a superior threshold steepness.

The method of manufacturing the liquid crystal display element of the invention allows a superior liquid crystal display element with a large surface area as described above to be simply manufactured.

BRIEF DESCRIPTION OF THE DRAWINGS

Preferred embodiments of the invention will be described in detail based on the following figures, wherein:

FIG. 7B shows the image of a display layer obtained in Comparative Example 1 which image is observed by the three-dimensional laser microscope, and FIG. 7C shows the image of a display layer obtained in Comparative Example 2 which image is observed by the three-dimensional laser microscope;

DETAILED DESCRIPTION OF THE INVENTION

The liquid crystal display element (occasionally, hereinafter referred to as the "display element") of the invention includes a pair of display substrates each having a support and at least one electrode provided on one surface of the support; and a display layer provided between the electrodes of the pair of display substrates, and the display layer contains gelatin and liquid crystal drops or liquid crystal microcapsules; and the liquid crystal drops or the liquid crystal microcapsules are densely arrayed in a monolayer The display element of the invention may have a light shielding layer on the electrode(s) of a display substrate on a non-display surface side, and a bonding layer between the light shielding layer and the display layer, or between the electrode(s) and the display layer, if necessary.

The type of liquid crystal used in the display element of the invention is not particularly limited, and cholesteric liquid crystal, nematic liquid crystal and guest-host liquid crystal can be used. Embodiments of the display element of the invention which embodiments include cholesteric liquid crystal will be described below.

Figure 1:
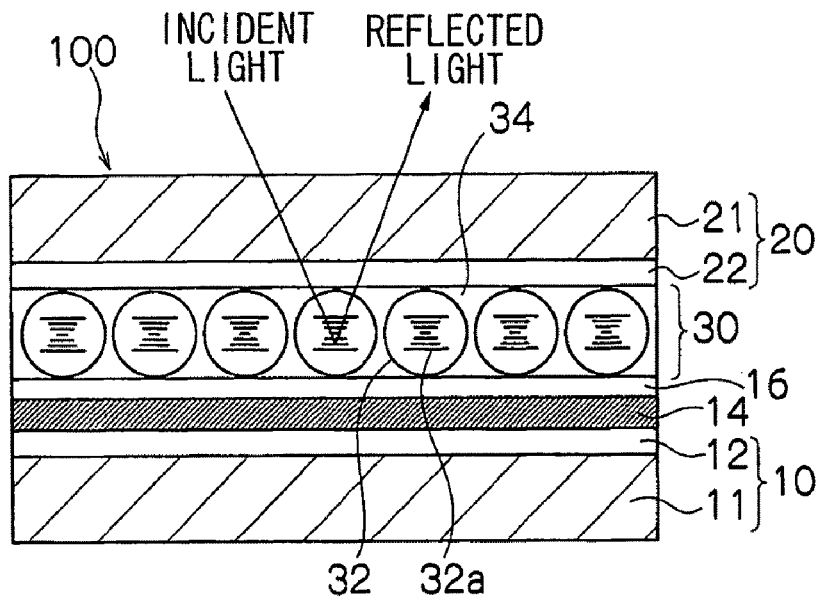
FIG. 1 is a conceptual view showing an example of the display element of the invention, which display element has a display layer containing liquid crystal drops.

The embodiments of the display element of the invention are described in figures. FIG. 1 shows a first embodiment of the display element of the invention.

The display element of the first embodiment has a display layer containing liquid crystal drops. In FIG. 1, the numeral 100 denotes a display element, the numerals 10 and 20 denote a pair of display substrates, and each of the numerals 11 and 21 denotes a support and the numerals 12 and 22 denote electrodes provided on the supports 11 and 21. The display substrates 10 and 20 are disposed so that the respective electrodes face each other. The numeral 14 denotes a light shielding layer provided on the electrode on a non-display surface side. The numeral 30 denotes a display layer, which contains cholesteric liquid crystal drops 32 and a polymeric binder 34, and cholesteric liquid crystal is denoted by 32a. The numeral 16 denotes a bonding layer formed between the light shielding layer 14 and the display layer 30. In this embodiment, the state of orientation of the cholesteric liquid crystal is controlled by applying voltage between the electrodes, and thereby incident light is selectively reflected by the cholesteric liquid crystal as shown in FIG. 1.

Since liquid crystal drops or liquid crystal microcapsules in the display layer of the display element of the invention are arrayed in a monolayer as described above, an area of disordered orientation is decreased in the vicinity of an interface of each liquid crystal drop or microcapsule, and thereby an effective reflection area is increased, which achieves bright display and restrains decrease in color purity caused by multiple reflection. In addition, surface irregularities becomes smaller, whereby adhesion between the bonding layer and the display layer can be improved at the time of lamination, and turbidity of black display caused by unnecessary selectively reflected light and interfacial reflected light can be reduced.

Figure 2:
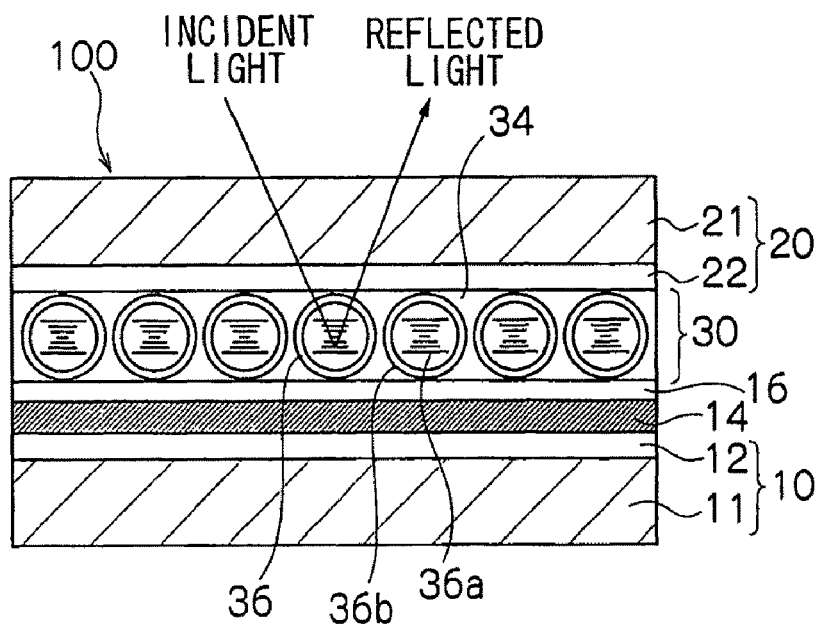
FIG. 2 is a conceptual view showing an example of the display element of the invention, which display element has a display layer containing liquid crystal microcapsules.

FIG. 2 shows a second embodiment of the display element of the invention.

This embodiment is different from the first embodiment only in that a display layer in which liquid crystal microcapsules are retained and dispersed in a polymeric binder. In each of the liquid crystal microcapsules, a polymeric shell encapsulates cholesteric liquid crystal. In FIGS. 1 and 2, members having the same reference numeral are the same. In FIG. 2, the numerals 36, 36a and 36b denote liquid crystal microcapsules, cholesteric liquid crystal and the polymeric shell of each liquid crystal microcapsule, respectively.

Figure 3:
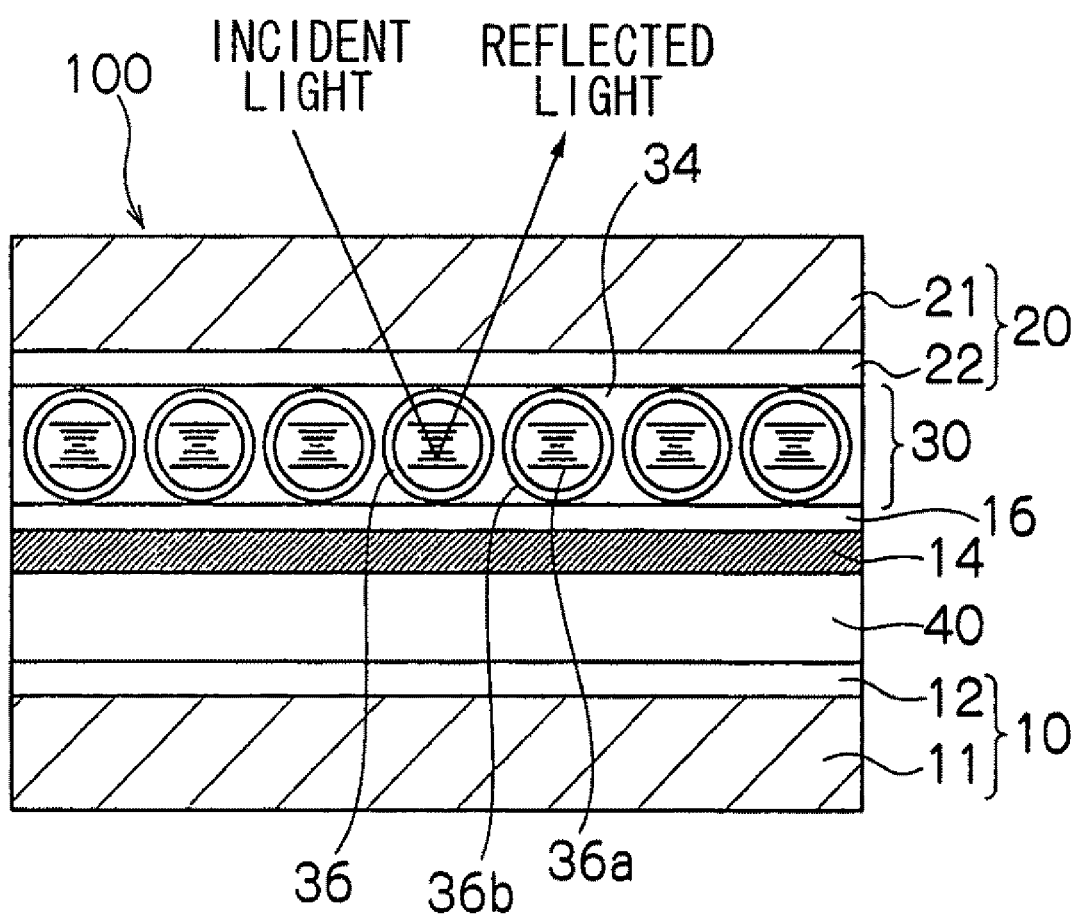
FIG. 3 is a conceptual view showing an example of the display element of the invention, in which optical writing is performed.

FIG. 3 shows a third embodiment of the display element of the invention.

A display element shown in FIG. 3 is different from the display element of FIG. 2 only in that a photoconductive layer 40 is provided between the electrode 12 and the light shielding layer 14. The state of orientation of the cholesteric liquid crystal is controlled by applying bias voltage between the electrodes 12 and 22 and irradiating the photoconductive layer 40 with writing light.

Next, each of the members employed in the display element described above is described.

The support is made of an insulating material, for example, glass, silicon or a polymer such as polyethylene terephthalate, polysulfone, polyether sulfone and polycarbonate. The polymer can be in the form of a film. At least a support on a display surface side is made of a material which transmits incident light and reflected light. A known functional film such as a stain preventing film, an abrasion-resistant film, a reflection preventing film and/or a gas barrier film may be formed on the surface of the support, if necessary.

The electrode is made of an electrically conductive material, for example, a metal such as gold or aluminum, a metal oxide such as indium oxide or tin oxide, or a conductive organic polymer such as polypyrrole, polyacethylene or polyaniline. At least an electrode on the display surface side is made of a material which transmits incident light and reflected light. A known functional film such as an adhesion improving film, the reflection preventing film and/or the gas barrier film may be formed on the surface of the electrode, if necessary.

The display layer has a structure in which drops or microcapsules of liquid crystal such as cholesteric (including chiral nematic) liquid crystal are retained and dispersed in a polymeric binder. The liquid crystal drops or the liquid crystal microcapsules in the display layer preferably have a uniform size.

The cholesteric liquid crystal can be a material in which a chiral component such as a steroid cholesterol derivative or an optically active material including Schiff base, an azo compound, an ester compound, or a biphenyl compound is added to nematic liquid crystal, smectic liquid crystal or mixed liquid crystal thereof, such as Schiff base, an azo compound, an azoxy compound, a benzoate compound, a biphenyl compound, a terphenyl compound, a cyclohexyl carboxylate compound, a phenylcyclohexane compound, a biphenylcyclohexane compound, a pyrimidine compound, a dioxane compound, a cyclohexyl cyclohexane ester compound, a cyclohexylethane compound, a cyclohexane compound, a tolane compound, an alkenyl compound, a stilbene compound, or a condensed polycyclic compound.

The polymeric binder is gelatin. The gelatin preferably has a high gel strength and a low sol viscosity as described later. Gelatin having high-molecular-weight β chain or γ chain which is a multimer of α chain, and gelatin having a large residue of α chain and including small amount of low-molecular-weight components which are obtained by cleavage of the main chain of a chain are suitable for such gelatin. Specifically, a gelatin material manufactured by acid-treating cattle bone is suitable for the above gelatin and is particularly preferable because of its high gel strength and its low sol viscosity. A first extract is preferable, which is initially extracted at the time that collagen serving as a raw material is hydrolyzed. In order to prevent ion contamination of liquid crystal materials, ion components remaining in gelatin may be removed by using a known technique such as ion exchange resin.

The bonding layer is made of the material to bring the display layer into close contact with the light shielding layer due to heat or pressure, such as a urethane resin, an epoxy resin, an acrylic resin or a silicone resin. A position at which the bonding layer is interposed is not limited to those in the above-described embodiments. The bonding layer may be interposed between the electrode and the display layer, or between the electrode and the light shielding layer. The bonding layer disposed between the electrode and the display layer is made of a material which transmits at least incident light and reflected light.

The light shielding layer is made of an insulating material, for example, an inorganic pigment such as a cadmium pigment, a chromium pigment, a cobalt pigment, a manganese pigment, or a carbon pigment, an organic dye or pigment such as an azo compound, an anthraquinone compound, an indigo compound, a triphenylmethane compound, a nitro compound, a phthalocyanine compound, a perylene compound, a pyrrolopyrrole compound, a quinacridone compound, a polycyclic quinone compound, a squarylium compound, an azulenium compound, a cyanine compound, a pyrylium compound, or an anthrone compound, or a material in which any of these is dispersed in a polymeric binder. The light shielding layer absorbs at least reflected light.

The photoconductive layer is made of an inorganic photoconductor such as a-Si:H, a-Se, Te—Se, $As_2Se_3$, CdSe or CdS, or an organic photoconductor in which a charge generating material such as an azo pigment, a phthalocyanine pigment, a perylene pigment, a quinacridone pigment, a pyrrolopyrrole pigment, an indigo pigment, or an anthrone pigment is combined with a charge transport material such as arylamine, hydrazone, triphenylmethane, or PVK.

Next, a method of manufacturing the display layer of the display element will be described. First, preparation of a coating solution for the display layer will be described.

[Preparation of Coating Solution for Display Layer]

First, a method of preparing liquid crystal drops and liquid crystal microcapsules will be described.

<Preparation of Liquid Crystal Drop Emulsion>

A liquid crystal drop emulsion is prepared by emulsifying and dispersing a disperse phase including at least cholesteric liquid crystal in a continuous phase that is incompatible with the disperse phase, such as an aqueous phase, in a drop-like state. In emulsification, a process in which the disperse phase is mixed with the continuous phase and then is dispersed therein as minute droplets by a mechanical shearing force of for example, a homogenizer, or a film-emulsifying process in which the disperse phase is allowed to pass through a porous film, extruded into the continuous phase and dispersed as minute droplets can be conducted. In particular, the film-emulsifying process is preferable since particle size variation of emulsified droplets are smaller to form liquid crystal drops having a uniform particle size. Trace of a surfactant and/or a protective colloid for stabilizing emulsification may be mixed with the continuous phase at the time of emulsification.

<Preparation of Liquid Crystal Microcapsule Slurry>

For preparation of liquid crystal microcapsules each having a polymeric shell that encapsulates cholesteric liquid crystal, a known microencapsulating process such as a phase separation process, an interfacial polymerization process, or an in-situ polymerization process can be employed. Specifically, liquid crystal drops manufactured above are dispersed in a solution containing a polymeric shell material or thermosetting the polymeric shell material to form a polymeric shell on the periphery of each liquid crystal drop. When urethane/urea polymeric shells are manufactured, it is preferable that liquid crystal drops including a polyisocyanate compound are prepared and added to a solution containing polyhydric alcohol and that urethane/urea forming reaction is caused.

A material that is not dissolved in a liquid crystal material to be encapsulated is employed for the polymeric shell. Examples thereof include gelatin, a cellulose derivative, gelatin-gum arabic, gelatin-Guerin's gum, gelatin-peptone, gelatin-carboxymethyl cellulose, polystyrene, polyamide, nylon, polyester, polyphenyl ester, polyurethane, polyurea, melamine-formalin resin, phenol-formalin resin, urea-formalin resin, acrylic resin, and methacrylic resin.

<Concentration>

Next, when the concentration of nonvolatile components (non-evaporable components) in the cholesteric liquid crystal drop emulsion or the cholesteric liquid crystal microcapsule slurry manufactured above is lower than the necessary, the cholesteric liquid crystal drop emulsion or cholesteric liquid crystal microcapsule slurry is concentrated to obtain a coating solution for a display layer having a desired concentration of the nonvolatile components. For concentration, a process in which the emulsion or slurry is allowed to stand or centrifuged to cause precipitation or sedimentation due to the difference between specific gravity of the continuous phase and that of the cholesteric liquid crystal drops or the cholesteric liquid crystal microcapsules and to separate and remove the continuous phase, or a process of filtering the emulsion or slurry with a membrane filter can be conducted.

<Preparation of Coating Solution for Display Layer>

A gelatin binder is added to the liquid crystal drop emulsion or the liquid crystal microcapsule slurry thus obtained to prepare a coating solution for a display layer.

In the invention, the liquid crystal drops or the liquid crystal microcapsules are applied to a substrate to form a monolayer in which they are dense. The content of each component in the crystal drop emulsion or the liquid crystal microcapsule slurry is measured with a densitometer or a gravimeter, and the mix ratio of the gelatin binder, a solvent, and the liquid crystal drops or the liquid crystal microcapsules in the coating solution for the display layer is adjusted on the basis of the measured contents.

Given that the ratio of volume of nonvolatile components to volume of a coating solution for a display layer is denoted as Sr, that the ratio of volume of liquid crystal drops or liquid crystal microcapsules to volume of the nonvolatile components is denoted as Lr, that the average particle diameter (μm) of the liquid crystal drops or the liquid crystal microcapsules is denoted as $D_L$ and that a wet coating thickness (μm) on the substrate is denoted as $t_W$, the ratio $A_L$ of an area covered by the liquid crystal drops or the liquid crystal microcapsules to a coated area is denoted as follows:

$$A_L = (3/2) \cdot (t_W \cdot Sr \cdot Lr / D_L) \quad \text{Formula (1)}$$

The coating solution for the display layer is preferably adjusted so that $A_L$ satisfies the following range:

$$0.8 < A_L < 1.0 \quad \text{Formula (2)}$$

Sr means Y/X when the amount of nonvolatile components remaining after the solvent has been vaporized from X cc of the coating solution for the display layer is Y cc, while Lr means Z/Y when Z cc of the liquid crystal drops or the liquid crystal microcapsules are contained in Y cc of the nonvolatile components.

The ratio Lr of volume of the liquid crystal drops or the liquid crystal microcapsules to volume of the nonvolatile components is preferably adjusted at 0.9 or less in order to prevent the drops or microcapsules from being broken by pressure.

The coating solution for the display layer is prepared by adjusting the mix quantities of the gelatin binder and the solvent with respect to the liquid crystal drop emulsion or the liquid crystal microcapsule slurry on the basis of the calculated mix ratio. The coating solution may contain trace of a known property modifier, such as a thickening agent, a wettability improving agent and/or a drying rate regulating agent.

The solvent to be employed in the invention dissolves gelatin, but, in the case of liquid crystal drops, does not dissolve liquid crystal, or, in the case of liquid crystal microcapsules, does not dissolve at least the polymeric shells of the microcapsules. Water or a mixture of water and alcohol such as methanol, ethanol or glycol is properly used as the solvent to be employed in the invention Next, a step of applying the coating solution for the display layer and a step of drying the resultant coating will be described.

<Application Step>

The coating solution for the display layer having an adjusted concentration as described above is applied to a display substrate with a known device which can form a layer made of the coating solution and having a desired wet thickness, such as an applicator, an edge coater, a screen coater, a roll coater, a curtain coater, or a die coater. It is necessary to heat gelatin to a temperature equal to or higher than the freezing point thereof so as to make the gelatin sol, which is flowable. Therefore, the temperature of the coating solution for the display layer is preferably set at a value within the range of 40 to 60° C.

<Drying Step>

Next, a drying step is conducted in which the solvent is evaporated from the coating layer formed on the display substrate by the application step. In this step, the display layer needs to be heated to a temperature equal to or higher than the freezing point of gelatin, and the temperature of the coating layer is preferably set at a temperature within the range of 40 to 60° C. Examples of a heating apparatus include an oven, a hot air blowing apparatus, and a hot plate.

When drying is conducted under this condition, the solvent evaporates and relative positions of uniformly dispersed liquid crystal drops or microcapsules gradually change to naturally form a monolayer. If this change is insufficient and multilayers may be formed, vibration such as mechanical vibration is effectively applied to the coating layer by a supersonic wave vibrator in a part or the total of the drying step. When the solvent has completely evaporated, a polymer-dispersed display layer can be obtained which has a flat surface with small surface irregularities, and which is a monolayer in which the liquid crystal drops or microcapsules are dense.

When the drying rate is too high, the liquid crystal drops or microcapsules tend to have distorted shapes due to intense liquid flow at dried end portions, and thus the direction of orientation of liquid crystal tends to incline with respect to a substrate surface. Here, for example, when cholesteric liquid crystal is used, selectively reflected light has large dependence on angle of visibility. Accordingly, rapid evaporation of the solvent is preferably restrained by mildly drying the coating layer. In order to restrain the rapid evaporation of the solvent, it is preferable that a coating portion is retained in an atmosphere in which vapor pressure thereof is the same as or close to the saturation vapor pressure of the solvent. This is achieved by using a process of retaining the coating portion in a vessel having as small capacity as possible, a process of retaining the coating portion in a chamber having a portion for generating steam of the solvent, or a process of setting the saturation vapor pressure of the solvent at a value equal to or lower than atmospheric pressure.

Figure 4A:
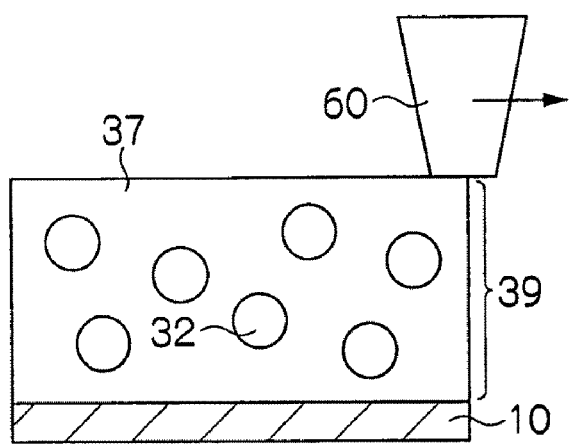
FIG. 4A is a conceptual view showing the application step of the method for manufacturing the liquid crystal display element of the invention.
Figure 4B:
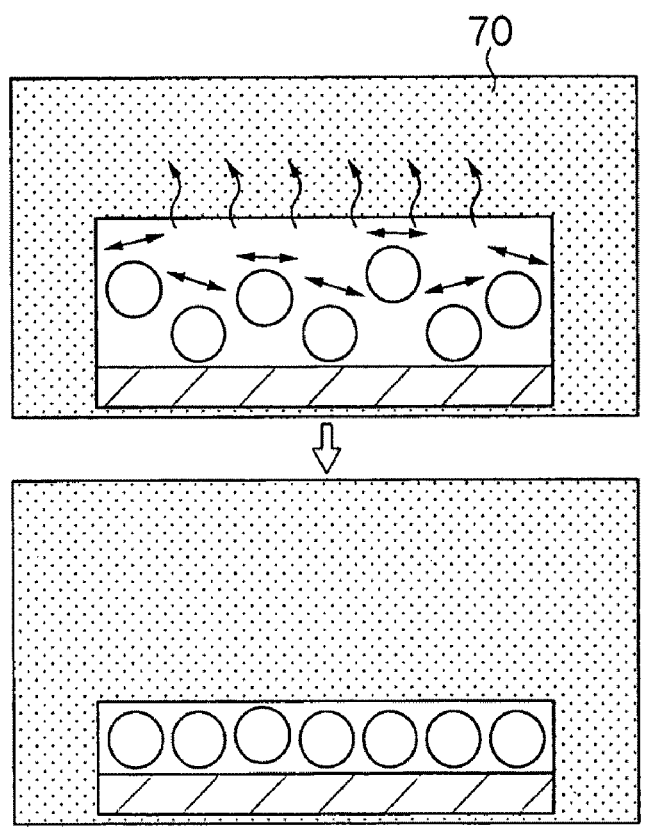
FIG. 4B is a conceptual view showing the drying step of the method of the invention.

A case in which a coating portion made of a coating solution for a display layer including liquid crystal drops dispersed in a solution including a gelatin binder and a solvent is retained in a vessel with as small capacity as possible will be described while referring to FIG. 4. FIG. 4A is a conceptual view showing an application step. In FIG. 4A, the numerals 10, 39, 37, 32 and 60 represent a display substrate, a coating layer, a continuous phase, liquid crystal drops and a coating device, respectively. The gelatin binder and the solvent are included in the continuous phase 37. The liquid crystal drops 32 are dispersed in the coating layer. FIG. 4B shows a drying step. As shown in FIG. 4B, the coating layer is retained in a closed vessel 70. The atmosphere therein is such that the vapor pressure of the solvent is close to the saturation vapor pressure thereof due to initial evaporation of the solvent. In this state, the solvent does not rapidly evaporate from the coating layer, and thereby each of the liquid crystal drops does not distort due to absence of intense liquid flow. As the solvent evaporates, the thickness of the coating film decreases, which causes the liquid crystal drops to gradually shift and form into a monolayer. When the solvent has completely evaporated, a display layer can be obtained which has a flat surface with small irregularities, and in which the liquid crystal drops are arrayed in the polymeric binder in a monolayer.

Figure 5A:
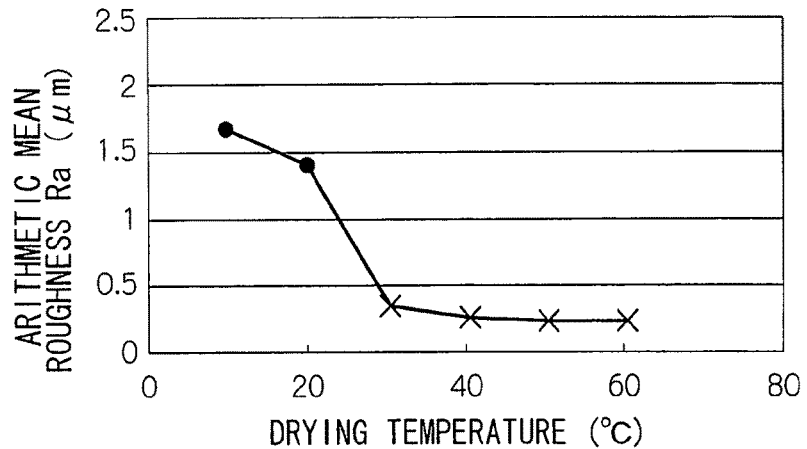
FIGS. 5A to 5C are graphs showing change of arithmetic mean roughness Ra on a display layer surface with respect to drying temperature.
Figure 5B:
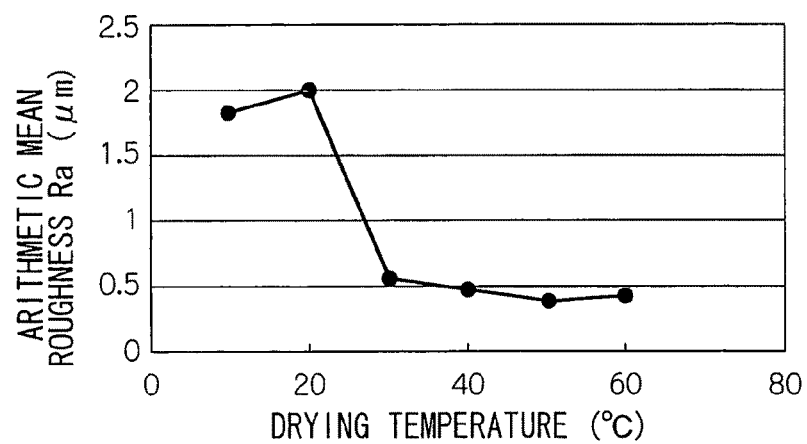
Figure 5C:
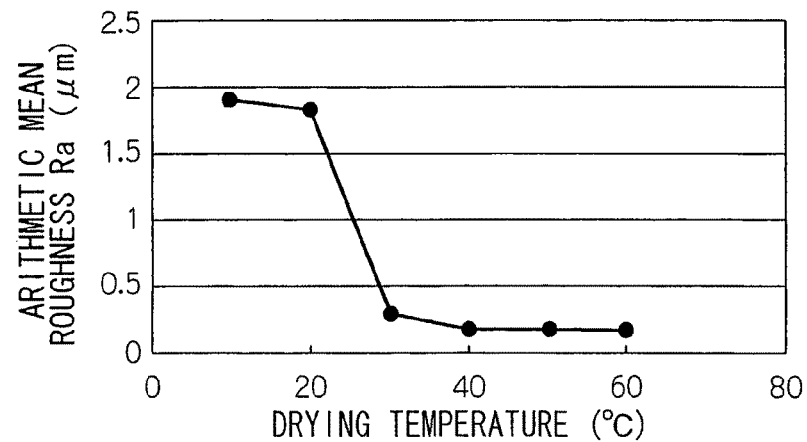

FIGS. 5A to 5C show change of arithmetic mean roughness Ra on the display layer surface with respect to drying temperature. FIG. 5A shows a graph of gelatin having a gel strength of 160 g and a sol viscosity of 30 mp, and obtain by acid-treating pig skin, and FIG. 5B shows a graph of gelatin having a gel strength of 285 g and a sol viscosity of 46 mp, and obtained by alkali-treating cattle bone and skin, and FIG. 5C shows a graph of gelatin having a gel strength of 314 g and a sol viscosity of 32 mp, and obtained by acid-treating cattle bone. In all of FIGS. 5A and 5C, the arithmetic mean roughness decreases at drying temperatures equal to or higher than the freezing point of the gelatin, at which sol-gel change occurs, with a range (20 to 30° C.) close to the freezing point being a transition region. In addition, gelatin having the relationship of FIG. 5A or FIG. 5C and a low sol viscosity forms a more flat surface with smaller surface irregularities than gelatin having the relationship of FIG. 5B and a high sol viscosity. On the other hand, the mark "x" in FIG. 5 shows that liquid crystal droplets escape from the dried display layer and appear on the surface of the dried display layer at temperatures represented by the mark. This phenomenon easily occurs when gelatin having the relationship of FIG. 5A and a low gel strength is used.

It is found from above that a gelatin material to be employed in the invention preferably has a high gel strength and a low sol viscosity such as gelatin used in FIG. 5C.

The reason why the above-mentioned drying behavior, which is a characteristic of the invention, occurs cannot strictly be clarified. However, when the mix proportion of the coating solution for the display layer is adjusted at a value out of the predetermined range, that is, when the ratio $A_L$ of the area covered by the liquid crystal drops to the coated area is made to be not more than 0.8 or not less than 1.0, void portions including no liquid crystal drop or multilayered portions in which liquid crystal drops accumulate in the direction of thickness uniformly occur in the overall display layer. From this fact, it is found that the same flow accumulation principle as in JP-A No. 09-90321 does not work. The reason for this is as follows. In the flow accumulation process, liquid crystal drops gather at dry end portions to form a monolayer film. Accordingly, when the area covered by the liquid crystal drops is not equal to the coated area as described above, monolayer portions occur at the end portions of a coated surface and void portions or multilayered portions occur at the central portion of the coated surface.

Meanwhile, even when the specific gravity of a liquid crystal material is substantially the same as that of a gelatin aqueous solution in the invention, a flat display layer can be obtained in which the liquid crystal drops or microcapsules are densely arrayed in a monolayer. From this fact, it is found that the reason why the liquid crystal drops are densely arrayed in a monolayer in the drying step is not that the liquid crystal drops naturally settle on a substrate surface or naturally precipitate on a liquid surface due to the difference between the specific gravity of the liquid crystal drops and that of a binder solution.

Figure 16:
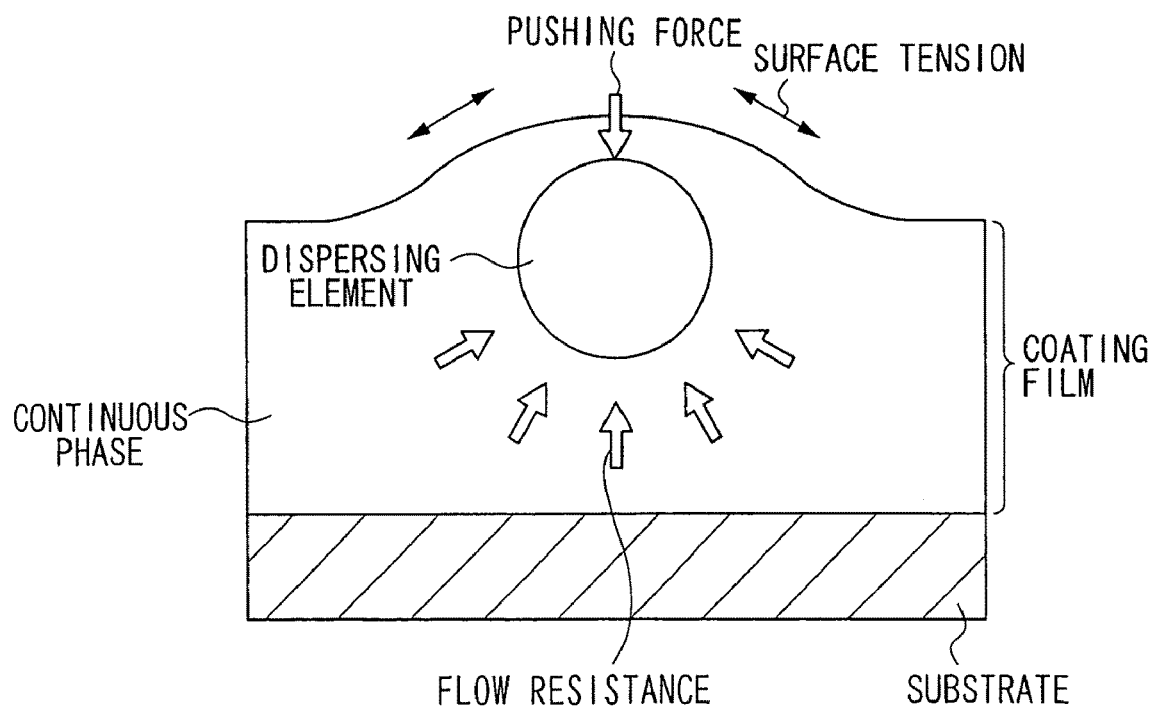
FIG. 16 is a conceptual view showing a process in which a coating layer containing a dispersing element is dried.

The reason why this phenomenon occurs in the invention is thought as shown in FIG. 16. Given that the difference between the specific gravity of a continuous phase and that of a dispersing element is disregarded, flow behavior of the dispersing element in a process where a coating solution containing the dispersing element is dried depends on balance between flow resistance resulting from the viscosity of the continuous phase and pushing force toward the inside of the coating layer which force results from surface tension of the coating solution.

Even when the concentration of gelatin which is in a sol state is increased, the viscosity thereof less changes than a general water-soluble polymer such as PVA. Therefore, the gelatin keeps a low viscosity even at a high concentration. Accordingly, even when the solvent in the coating layer is evaporated and the concentration of gelatin in the coating layer rises, the flow resistance of the coating layer does not easily increase and then liquid crystal drops easily flow until the drying process is almost finished.

When drying progresses and begins to shift from a stage in which moisture movement in the surface or the portion of a coating which portion is near the surface determines a drying rate to a stage in which moisture movement in the portion disposed inside of the coating determines a drying rate, the moisture content of the coating layer surface has decreased and the concentration of gelatin in the surface or the portion near the surface of the coating has become higher than that of the inside. A three-dimensional structure of the gelatin is gradually formed on the surface with the increase of the gelatin concentration, so that surface tension sharply increases.

That is, the process of drying gelatin used as a binder at a temperature equal to or higher than the freezing point thereof according to the invention can more rise the ratio of surface tension to viscosity in the drying process than a process of drying gelatin at a temperature equal to or lower than the freezing point thereof, or a process in which other water-soluble polymer is used as a binder. Consequently, the following is thought. The ratio of pushing force to flow resistance is so large that the liquid crystal drops are pressed toward the inside of the coating layer while rearrayed. Therefore, a leveling effect of flattening the coating surface acts greatly.

According to the above consideration, it is preferable to employ gelatin having a gel strength, which affects surface tension, as high as possible and a sol viscosity, which affects flow resistance, as low as possible in order to obtain a greater leveling effect.

EXAMPLES

The invention will be more specifically described hereinafter by referring to examples but is not limited thereto.

Example 1

Preparation of Coating Solution for Display Layer 77.5 mass % of nematic liquid crystal (E7 (trade name) manufactured by Merck & Co., Inc.), 18.8 mass % of a chiral agent 1 (CB15 (trade name) manufactured by Merck & Co., Inc.) and 3.7 mass % of a chiral agent 2 (R1011 (trade name) manufactured by Merck & Co., Inc.) are mixed to prepare cholesteric liquid crystal that selectively reflects light of green color.

The cholesteric liquid crystal is emulsified in a 0.25 mass % aqueous solution of sodium dodecylbenzenesulfonate at a nitrogen pressure of 0.12 kgf/cm$^2$ with a membrane emulsification device (MICRO KIT (trade name) manufactured by SPG TECHNOLOGY Co., Ltd.) which includes a ceramic porous film having a pore side of 4.2 μm. The state of dispersion of the resultant emulsion, which includes cholesteric liquid crystal drops having an average size of 14.9 μm and a size standard deviation of 1.32 μm, is close to monodisperse.

Next, the emulsion is allowed to stand so as to cause the cholesteric liquid crystal drops to settle. The resultant supernatant is removed to obtain a condensed emulsion. The ratio of volume of the cholesteric liquid crystal drops to that of the condensed emulsion is measured with a densitometer (DMA35n (trade name) manufactured by Nihon SiberHegner K.K.) and found to be 0.535.

The ratio $A_L$ of an area covered by the liquid crystal drops to a coated area and a wet coating thickness are set at 0.95 and 90 μm, respectively. The ratio (SrxLr) of volume of the cholesteric liquid crystal drops to that of a coating solution for a display layer is calculated from the above-mentioned formula (1), the average size (14.9 μm) of the cholesteric liquid crystal drops and the wet coating thickness (90 μm) on a display substrate, and found to be 0.10 (10 vol %). On the basis of this value, 4 parts by mass of a 7.7 mass % aqueous solution of acid-treated bone gelatin having a gel strength of 314 g and a sol viscosity of 32 mp and manufactured by Nippi, Incorporated is added to one part by mass of the condensed emulsion so as to obtain a coating solution for a display layer in which the ratio of volume of nonvolatile components (non-evaporable components) to that of the coating solution for the display layer is approximately 0.15 and in which the ratio of volume of the cholesteric liquid crystal to that of the nonvolatile components is approximately 0.70.

Manufacture of Display Layer

<Application Step>

Figure 6A:
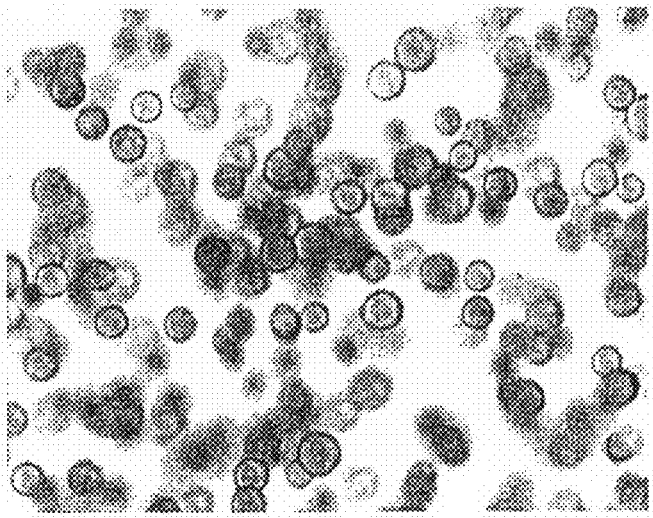
FIG. 6A shows the micrograph of a coating layer after an application step has been completed in Example 1.

The coating solution for the display layer is heated to 50° C. to make gelatin contained therein sol and the heated coating solution is applied to a PET display substrate (Highbeam (trade name) manufactured by Toray Industries, Inc.) having ITO transparent electrodes sputtered and a thickness of 125 μm with an applicator which has a micrometer and in which the gap between the applicator and the substrate surface is adjusted so that a wet coating thickness of 90 μm can be obtained. FIG. 6A shows the transmission micrograph of the resultant coating. The cholesteric liquid crystal drops are uniformly dispersed in the coating.

<Drying Step>

Figure 6B:
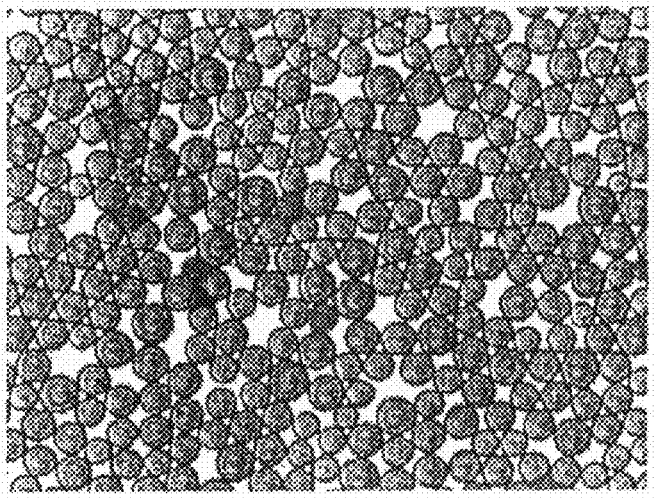
FIG. 6B shows the micrograph of the coating layer after a retaining step has been completed in Example 1.
Figure 6C:
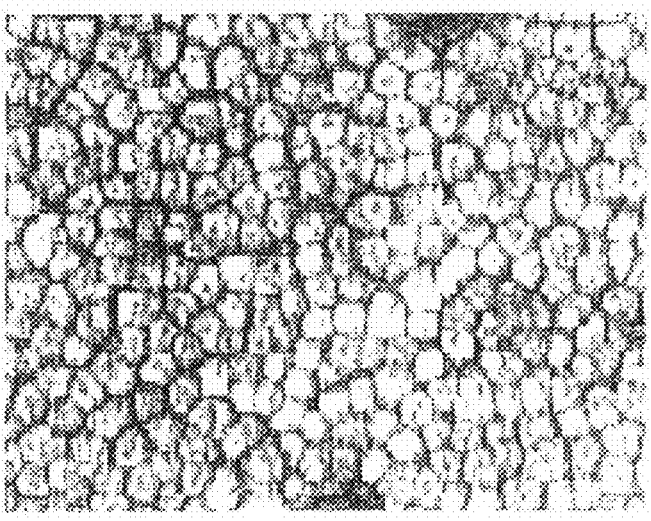
FIG. 6C shows the micrograph of the coating layer after a drying step has been completed in Example 1.

Subsequently, the display substrate to which the coating solution for the display layer has been applied is put on a hot plate kept at 50° C. and the hot plate is covered with a polyethylene case. In this state, the display substrate is retained for 15 minutes. FIG. 6B shows the transmission micrograph of the coating, which is being dried. The cholesteric liquid crystal drops are gradually changed into a monolayer while the relative positions thereof change little by little. When the coating film has been completely dried by further evaporating the solvent contained in the coating, the film has shrunk and the thickness thereof has decreased and the cholesteric liquid crystal takes planar orientation and provides selectively reflected light of green color. As shown in the reflective micrograph of FIG. 6C, the dried coating film has become a display layer in which the cholesteric liquid crystal drops are densely arrayed in a monolayer.

Figure 7A:
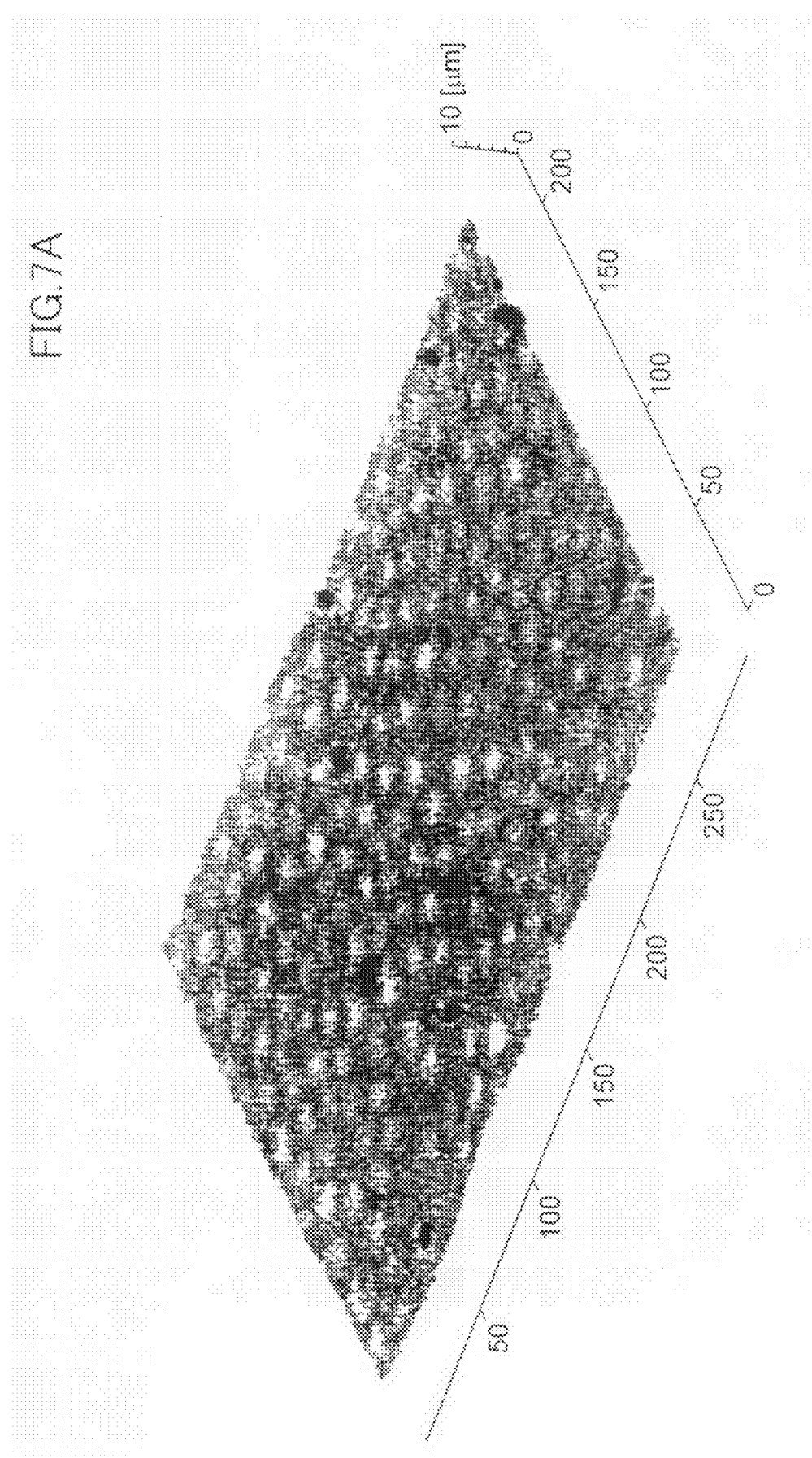
FIG. 7A shows the image of a display layer obtained in Example 1 which image is observed by a three-dimensional laser microscope.
Figure 8A:
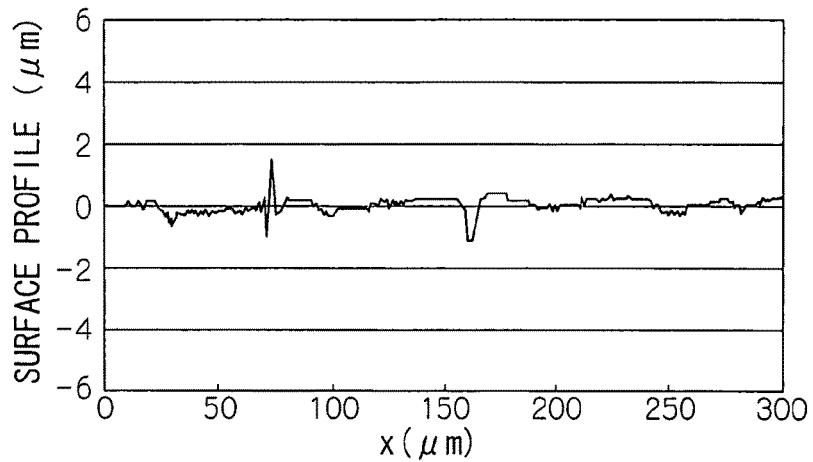
FIG. 8A shows a graph in which the image of FIG. 7A is shown by surface profile.

FIGS. 7A and 8A show the image of the obtained display layer which image is observed by a three-dimensional laser microscope (VK8500 (trade name) manufactured by KEYENCE Corporation) and measured values of surface profile thereof, respectively. It is found that a flat surface having small irregularities can be achieved.

Another PET substrate (Highbeam (trade name) manufactured by Toray Industries, Inc.) having ITO transparent electrodes sputtered and a thickness of 125 μm is used as another display substrate. A polyvinyl alcohol aqueous solution with dispersed carbon black pigment particles is applied to the substrate by a spin coating method to form a light shielding layer having a thickness of 2.0 μm.

An urethane laminating agent (LX719/KY-90 (trade name) manufactured by Dainippon Ink and Chemicals, Incorporated) is applied to the light shielding layer by a spin coating method to form a bonding layer having a thickness of 1 μm.

The two display substrates thus manufactured are superposed so that the display layer and the bonding layer face each other. The resultant is made to pass through a laminator kept at 100° C. to bond these display substrates. A display element is thus obtained.

Comparative Example 1

A display substrate with a display layer is prepared in the same manner as in Example 1, except that drying temperature is set at 18° C. which is not more than the freezing point of gelatin.

Figure 8B:
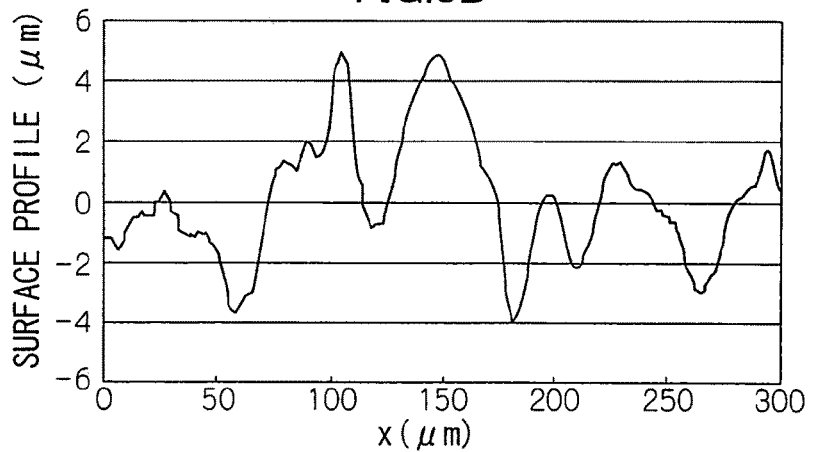
FIG. 8B shows a graph in which the image of FIG. 7B is shown by surface profile.

FIGS. 7B and 8B show the image of the obtained display layer which image is observed by a three-dimensional laser microscope (VK8500 (trade name) manufactured by KEYENCE Corporation) and measured values of surface profile thereof, respectively. It is found that the resultant surface has larger irregularities and is less smooth than in Example 1.

Another PET substrate (Highbeam (trade name) manufactured by Toray Industries, Inc.) having ITO transparent electrodes sputtered and a thickness of 125 μm is used as another display substrate. A polyvinyl alcohol aqueous solution with dispersed carbon black pigment particles is applied to the substrate by a spin coating method to form a light shielding layer having a thickness of 2.0 μm.

An urethane laminating agent (LX719/KY-90 (trade name) manufactured by Dainippon Ink and Chemicals, Incorporated) is applied to the light shielding layer by a spin coating method to form a bonding layer having a thickness of 1 μm.

The two display substrates thus manufactured are superposed so that the display layer and the bonding layer face each other. The resultant is made to pass through a laminator kept at 100° C. to bond these display substrates. A display element is thus obtained.

Comparative Example 2

A mixed solution of one part by mass of the same cholesteric liquid crystal as in Example 1, and 8 parts by mass of a 5.0 mass % aqueous solution of partially saponified PVA having a polymerization degree of 500 and manufactured by Wako Pure Chemical Industries, Ltd. is emulsified at 10000 rpm with a homogenizer (GLH type manufactured by Omni Co.) to obtain a coating solution for a display layer in which the ratio of volume of nonvolatile components to that of the coating solution for the display layer is approximately 0.15 and in which the ratio of volume of the cholesteric liquid crystal to that of the nonvolatile components is approximately 0.70.

The obtained coating solution emulsion for the display layer, which includes cholesteric liquid crystal drops having an average size of 12.3 μm and a size standard deviation of 5.6 μm, is in a polydispersed state.

The coating solution for the display layer kept at room temperature is applied to a PET substrate (trade name: Highbeam, manufactured by Toray Industries, Inc.) having ITO transparent electrodes sputtered and a thickness of 125 μm with an applicator which has a micrometer and in which the gap between the applicator and the substrate surface is adjusted so that a wet coating thickness of 100 μm can be obtained.

Subsequently, this substrate is put on a hot plate kept at 60° C. to evaporate moisture in the resultant coating film. A display layer is thus obtained.

Figure 8C:
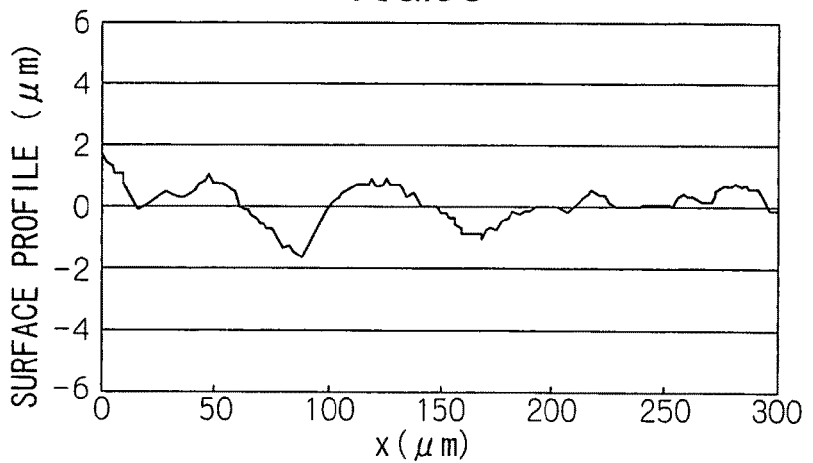
FIG. 8C shows a graph in which the image of FIG. 7C is shown by surface profile.

FIGS. 7C and 8C show the image of the obtained display layer which image is observed by a three-dimensional laser microscope (VK8500 (trade name) manufactured by KEYENCE Corporation) and measured values of surface profile thereof, respectively. It is found that the surface has larger irregularities and is less smooth than in Example 1, though the irregularities are smaller than in Comparative Example 1.

Another PET substrate (Highbeam (trade name) manufactured by Toray Industries, Inc.) having ITO transparent electrodes sputtered and a thickness of 125 μm is used as another display substrate. A polyvinyl alcohol aqueous solution with dispersed carbon black pigment particles is applied to the substrate by a spin coating method to form a light shielding layer having a thickness of 2.0 μm.

An urethane laminating agent (LX719/KY-90 (trade name) manufactured by Dainippon Ink and Chemicals, Incorporated) is applied to the light shielding layer by a spin coating method to form a bonding layer having a thickness of 1 μm.

The two display substrates thus manufactured are superposed so that the display layer and the bonding layer face each other. The resultant is made to pass through a laminator kept at 100° C. to bond these display substrates. A display element is thus obtained.

Example 2

A cholesteric liquid crystal emulsion is prepared in the same manner as in Example 1. A water-soluble melamine-formalin resin (MX-035 (trade name) manufactured by Sanwa Chemical Industries, Ltd.) is added thereto such that the amount of the resin is one fifth of that of the cholesteric liquid crystal in terms of part by mass. They are reacted at 65° C. for 3 hours to obtain a slurry including microcapsules each of which has a shell made of the melamine-formalin resin and encapsulating the cholesteric liquid crystal. The average size of the microcapsules is 15.2 μm.

Next, the slurry is allowed to stand so as to the microcapsules to settle. The resultant supernatant is removed to obtain a condensed slurry. The ratio of volume of the microcapsules to that of the condensed slurry is measured with a densitometer (DMA35n (trade name) manufactured by Nihon Siber-Hegner K.K.) and found to be 0.482.

The ratio $A_L$ of an area covered by the liquid crystal microcapsules to a coated area and a wet coating thickness are set at 0.95 and 90 μm, respectively. The ratio ($S_r \times L_r$) of volume of the cholesteric liquid crystal microcapsules to that of a coating solution for a display layer is calculated from the above-mentioned formula (1), the average size (15.2 μm) of the cholesteric liquid crystal microcapsules and the wet coating thickness (90 μm) on a display substrate, and found to be 0.10 (10 vol %). On the basis of this value, 3.5 parts by mass of a 7.9 mass % aqueous solution of acid-treated bone gelatin having a gel strength of 314 g and a sol viscosity of 32 mp and manufactured by Nippi, Incorporated is added to one part by mass of the condensed slurry so as to obtain a coating solution for a display layer in which the ratio of volume of nonvolatile components to that of the coating solution for the display layer is approximately 0.15 and in which the ratio of volume of the cholesteric liquid crystal microcapsules to that of the nonvolatile components is approximately 0.70.

The coating solution for the display layer is heated to 50° C. to make gelatin contained therein sol and the heated coating solution is applied to a PET display substrate (Highbeam (trade name) manufactured by Toray Industries, Inc.) having ITO transparent electrodes sputtered and a thickness of 125 μm with an applicator which has a micrometer and in which the gap between the applicator and the substrate surface is adjusted so that a wet coating thickness of 90 μm can be obtained.

Subsequently, the display substrate to which the coating solution for the display layer has been applied is retained in a chamber kept at a high temperature of 50° C. and a high humidity of 85% RH for 20 minutes. As the coating film is dried, the film shrinks and the thickness thereof decreases. When the coating film has been completely dried, the cholesteric liquid crystal takes planar orientation and the film provides selectively reflected light of green color. A display layer in which the cholesteric liquid crystal microcapsules are densely arrayed in a monolayer is thus obtained.

Another PET substrate (Highbeam (trade name) manufactured by Toray Industries, Inc.) having ITO transparent electrodes sputtered and a thickness of 125 μm is used as another display substrate. A polyvinyl alcohol aqueous solution with dispersed carbon black pigment particles is applied to the substrate by a spin coating method to form a light shielding layer having a thickness of 2.0 μm.

An urethane laminating agent (LX719/KY-90 (trade name) manufactured by Dainippon Ink and Chemicals, Incorporated) is applied to the light shielding layer by a spin coating method to form a bonding layer having a thickness of 1 μm.

The two display substrates thus manufactured are superposed so that the display layer and the bonding layer face each other. The resultant is made to pass through a laminator kept at 100° C. to bond these display substrates. A display element is thus obtained.

Example 3

An adduct (Takenate D110N (trade name) manufactured by Takeda Chemical Industries, Ltd.) of xylene diisocyanate to trimethylolpropane at a ratio of 3:1 and ethyl acetate are added to the same cholesteric liquid crystal as in Example 1 so that the amount of each of these components is one fifth of that of the cholesteric liquid crystal in terms of part by mass. The resultant is stirred to obtain a uniform solution serving as an oil phase.

One part by mass of ethyl acetate is added to 10 parts by mass of a 1.0 mass % aqueous solution of partially saponified PVA having a polymerization degree of 500 and manufactured by Wako Pure Chemical Industries, Ltd., and the resultant is stirred at 70° C. and then cooled down to room temperature. Another uniform solution serving as an aqueous phase is obtained by removing a part of ethyl acetate which part has not been dissolved.

The oil phase is emulsified in the aqueous phase at a nitrogen pressure of 0.10 kgf/cm$^2$ with a membrane emulsification device (MICRO KIT (trade name) manufactured by SPG TECHNOLOGY Co., Ltd.) which includes a ceramic porous film having a pore diameter of 4.2 μm.

The state of dispersion of the resultant emulsion, which includes oil phase droplets having an average size of 15.7 μm and a size standard deviation of 1.81 μm, is close to monodisperse.

Next, one gram of a 10 mass % aqueous solution of 1,4-butanediol is dripped into the emulsion and the resultant is stirred at 70° C. for 90 minutes to cause polymerization reaction. A slurry including liquid crystal microcapsules each of which has a shell made of the resultant urethane urea resin and encapsulating the cholesteric liquid crystal. The average size of the liquid crystal microcapsules is 14.3 μm.

The liquid crystal microcapsule slurry is diluted with a large quantity of water. The resultant is stirred and then centrifuged with a centrifugal separator so as to settle the liquid crystal microcapsules. The resultant supernatant is removed to obtain a condensed slurry including the liquid crystal microcapsules. This process is repeated twice to remove a part of polyvinyl alcohol and ethyl acetate. A liquid crystal microcapsule slurry is thus obtained. The ratio of volume of the liquid crystal microcapsules to that of the slurry is measured with a densitometer (DMA35n (trade name) manufactured by Nihon SiberHegner K.K.) and found to be 0.505.

The ratio $A_L$ of an area covered by the liquid crystal microcapsules to a coated area and a wet coating thickness are set at 0.95 and 90 μm, respectively. The ratio (Sr×Lr) of volume of the cholesteric liquid crystal microcapsules to that of a coating solution for a display layer is calculated from the above-mentioned formula (1), the average size (14.3 μm) of the cholesteric liquid crystal microcapsules and the wet coating thickness (90 μm) on a display substrate, and found to be 0.10 (10 vol %). On the basis of this value, 3.7 parts by mass of a 7.8 mass % aqueous solution of acid-treated bone gelatin having a gel strength of 314 g and a sol viscosity of 32 mp and manufactured by Nippi, Incorporated is added to one part by mass of the slurry so as to obtain a coating solution for a display layer in which the ratio of volume of nonvolatile components to that of the coating solution for the display layer is approximately 0.15 and in which the ratio of volume of the cholesteric liquid crystal microcapsules to that of the nonvolatile components is approximately 0.70.

The coating solution for the display layer is heated to 50° C. to make gelatin contained therein sol and the heated coating solution is applied to a PET display substrate (Highbeam (trade name) manufactured by Toray Industries, Inc.) having ITO transparent electrodes sputtered and a thickness of 125 μm with an applicator which has a micrometer and in which the gap between the applicator and the substrate surface is adjusted so that a wet coating thickness of 90 μm can be obtained.

Subsequently, dimethyl silicone oil (KF96 (trade name) manufactured by Shin-Etsu Chemical Co., Ltd.) is applied to a supersonic wave vibrating plate (UI304 (trade name) manufactured by Sharp Corporation) and the substrate to which the coating solution for the display layer has been applied is put on the supersonic wave vibrating plate. The supersonic wave vibrating plate is covered with a polyethylene case. The supersonic wave vibrating plate is retained in an oven kept at 50° C. for 15 minutes while supersonic wave is being applied to the substrate. As the coating film is dried, the film shrinks and the thickness thereof decreases. When the coating film has been completely dried, the cholesteric liquid crystal takes planar orientation and the film provides selectively reflected light of green color. A display layer in which the cholesteric liquid crystal microcapsules are densely arrayed in a monolayer is thus obtained.

A glass substrate manufactured by EHC Corporation and having ITO transparent electrodes sputtered and a thickness of 1.1 μm is used as another display substrate. A solution including as a solvent butanol and also including polyvinyl butyral in which a titanyl phthalocyanine pigment having a high sensitivity with respect to visible light having wavelengths of 600 nm or more is dispersed is applied to the substrate by a spin coating method to form a layer having a thickness of 200 nm. Thereafter, a solution including as a solvent monochlorobenzene and also including bisphenol Z polycarbonate in which N,N'-bis(3-methylphenyl)-1,1'-biphenyl-4,4'-diamine is dispersed is applied to the layer by a spin coating method to form another layer having a thickness of 3 μm. Furthermore, a solution including as a solvent butanol and also including polyvinyl butyral in which a titanyl phthalocyanine pigment having a high sensitivity with respect to visible light having wavelengths of 600 nm or more is dispersed is applied to the resultant layer by a spin coating method to form still another layer having a thickness of 200 nm. A photoconductive layer is thus formed.

A polyvinyl alcohol aqueous solution with dispersed carbon black pigment particles is applied to the photoconductive layer by a spin coating method to form a light shielding layer having a thickness of 2.0 μm. Moreover, an urethane laminating agent (LX719/KY-90 (trade name) manufactured by Dainippon Ink and Chemicals, Incorporated) is applied to the light shielding layer by a spin coating method to form a bonding layer having a thickness of 1 μm.

The two display substrates thus manufactured are superposed so that the display layer and the bonding layer face each other. The resultant is made to pass through a laminator kept at 100° C. to bond these display substrates. A display element is thus obtained.

Measurement of Display Properties

Figure 9:
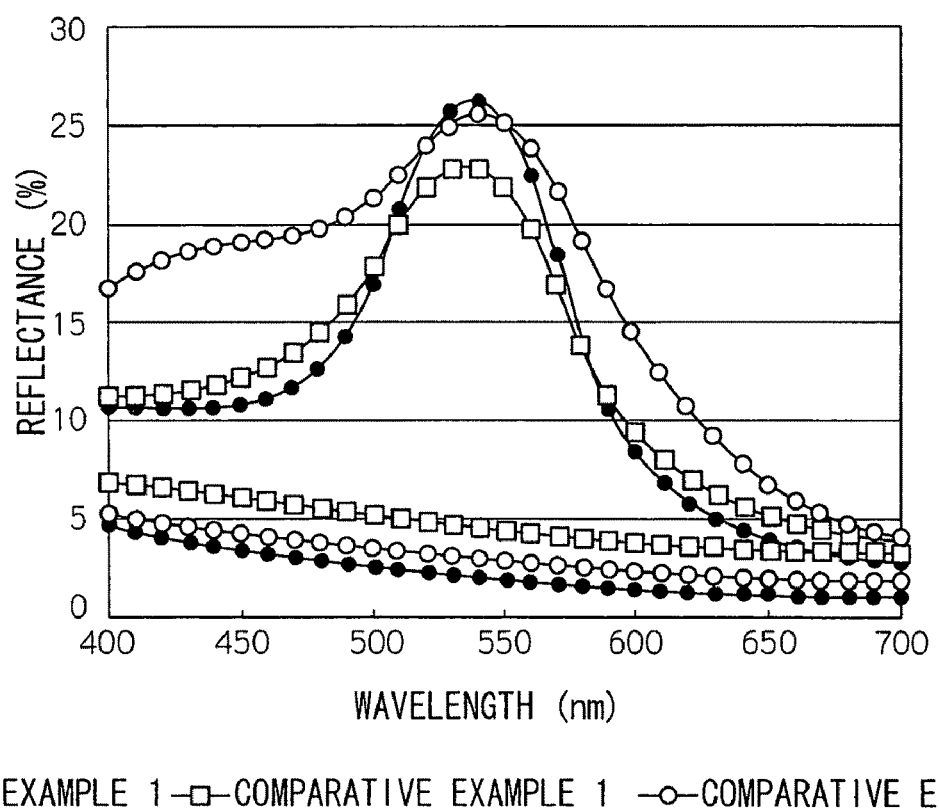
FIG. 9 is a graph showing reflection spectra of display elements of Example 1 and Comparative Examples 1 and 2 in a planar state and a focal conic state.
Figure 10A:
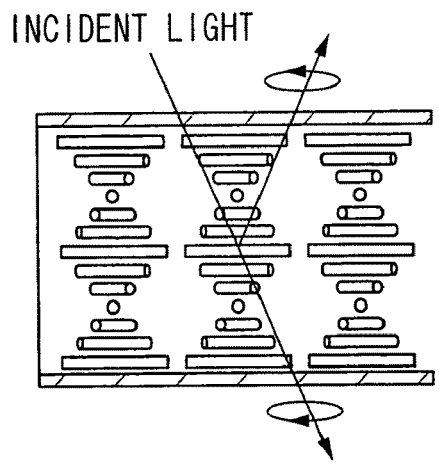
FIGS. 10A to 10C are views showing array states of cholesteric liquid crystal.
Figure 10B:
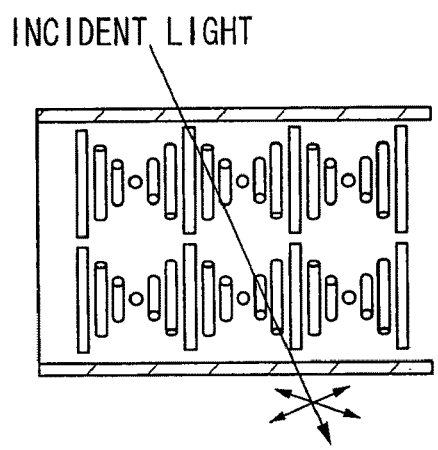
Figure 10C:
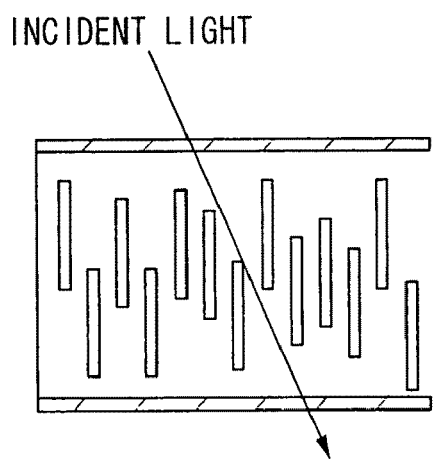
Figure 11:
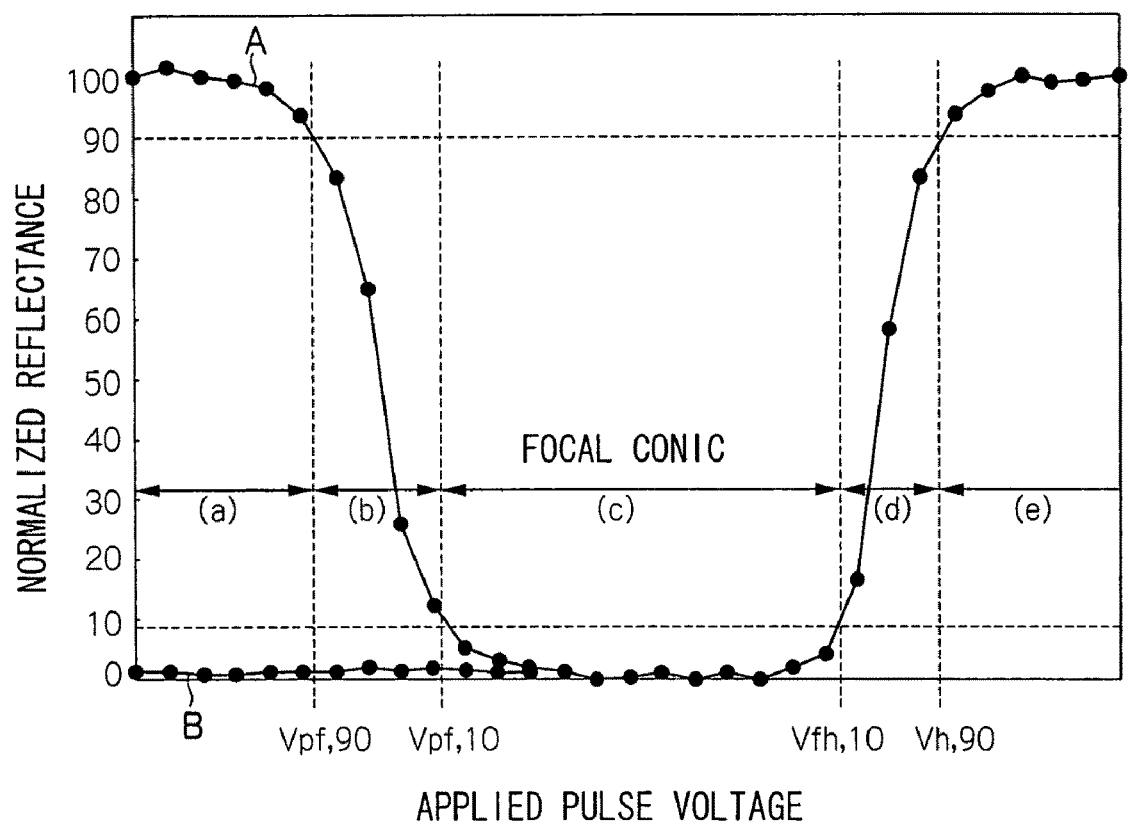
FIG. 11 is a graph showing an electrooptical response of cholesteric liquid crystal having positive dielectric anisotropy.
Figure 12:
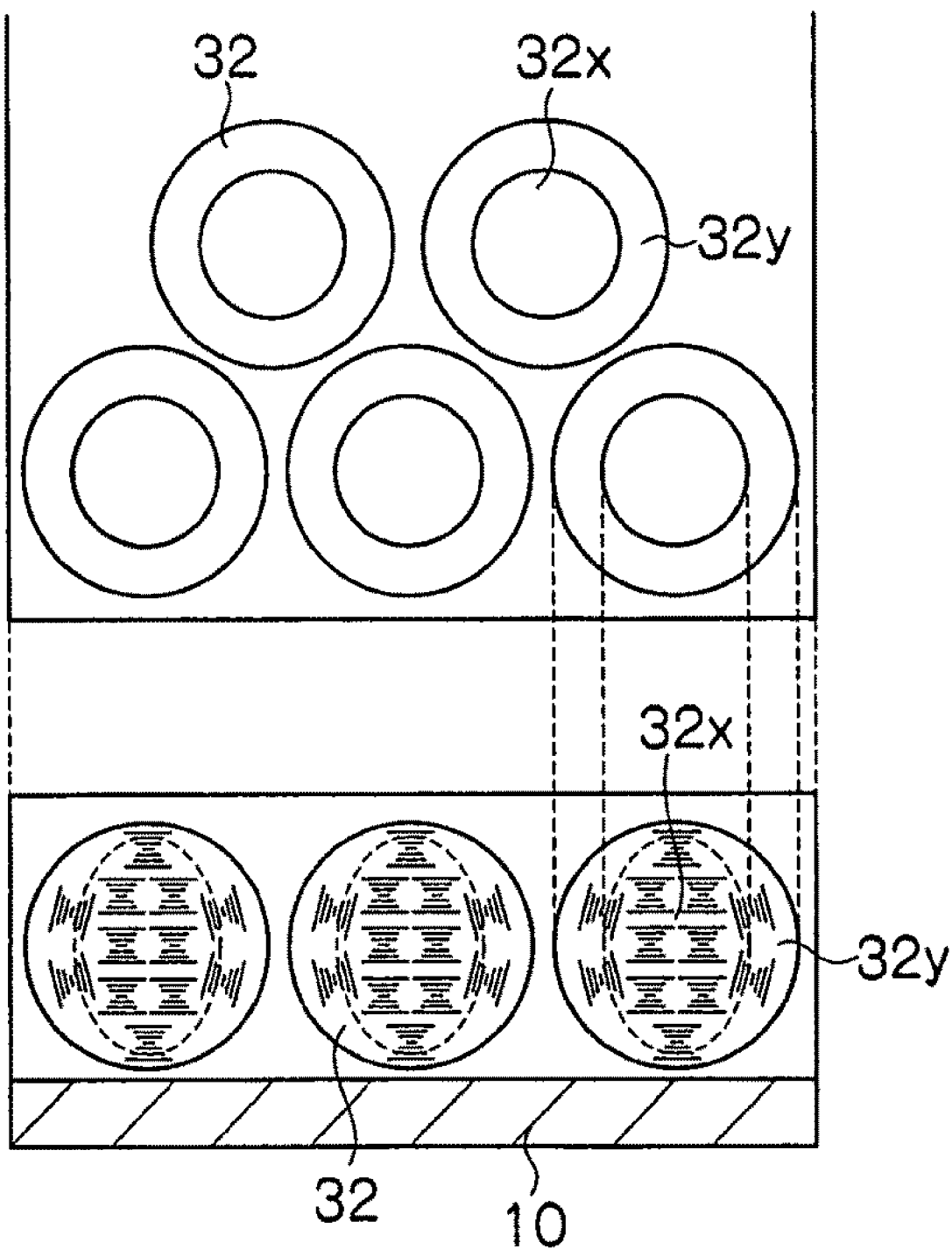
FIG. 12 is a conceptual view showing liquid crystal drops in the display layer of a conventional display element.
Figure 13A:
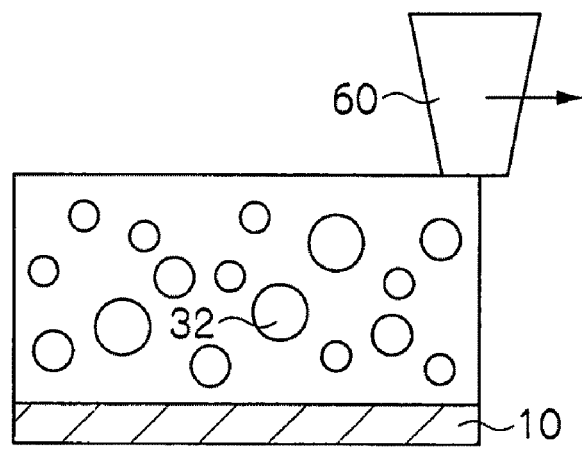
FIG. 13A shows the application step of a conventional method of manufacturing a display layer in which liquid crystal is polydispersed.
Figure 13B:
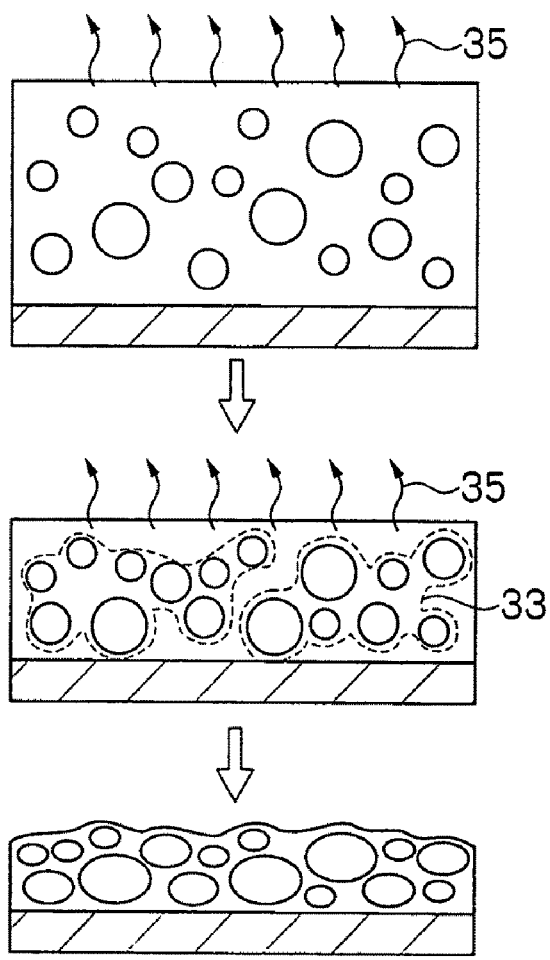
FIG. 13B shows the drying step of the method.
Figure 14A:
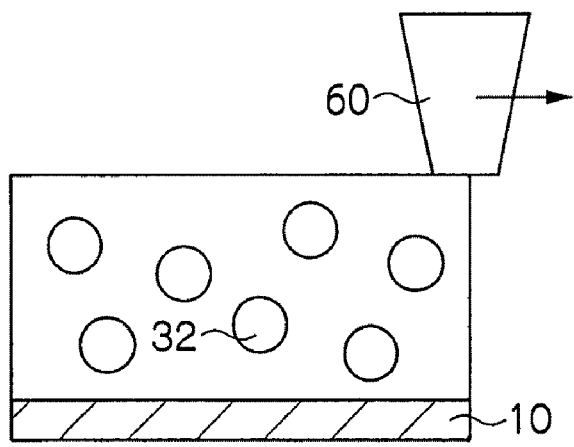
FIG. 14A shows the application step of another conventional method of manufacturing a display layer in which liquid crystal is monodispersed.
Figure 14B:
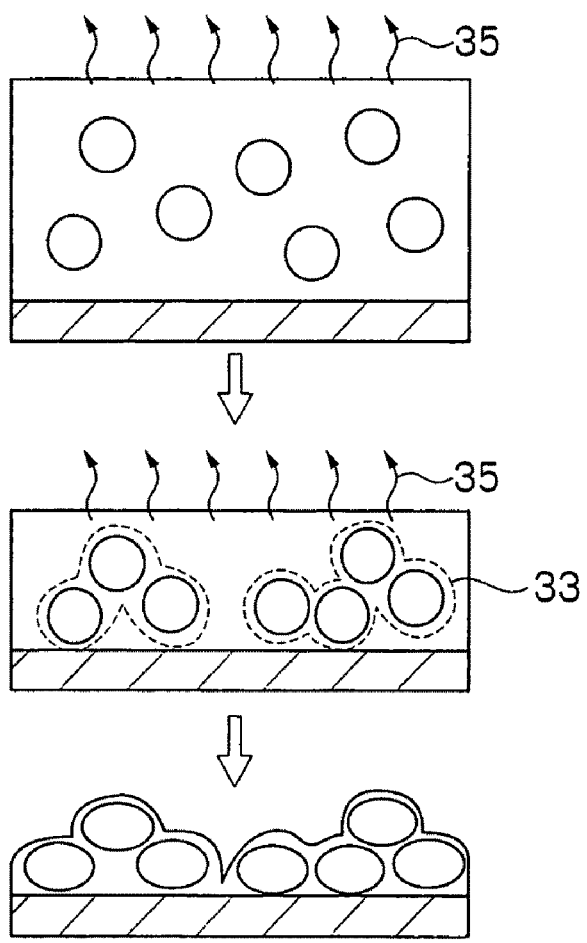
FIG. 14B shows the drying step of the method.
Figure 15:
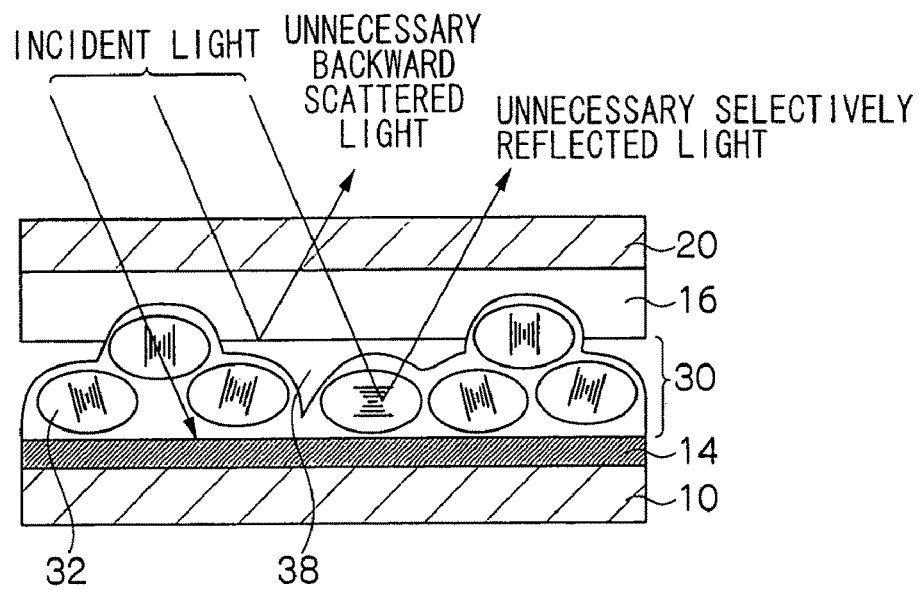
FIG. 15 is a conceptual view showing that black reflectance deteriorates when surface irregularities in a liquid crystal drop layer are large in a conventional display device.

The display properties of the display elements of Example 1, and Comparative Examples 1 and 2 which are in a planar state or a focal conic state are measured with an integrating sphere type spectrocolorimeter (CM2022 (trade name) manufactured by KONICA MINOLTA HOLDINGS, INC.). FIG. 9 shows the measured results of reflection spectra, and Table 1 shows reflectance (Rpeak) and color purity (C*) at a peak wavelength in a planar state, and luminous reflectance Y value (Ymin) in a focal conic state, which are obtained from the reflection spectra.

As is clear from Table 1, the display element of the invention has high reflectance and high chroma in a bright state due to planar, and low reflectance in a dark state due to focal conic. On the contrary, the display elements of Comparative Examples 1 and 2 have low reflectance in a planar state, and high reflectance in a focal conic state.

TABLE 1

|  | Bright Reflectance Rpeak | Color Purity C* | Black Reflectance Ymin |
|---|---|---|---|
| Example 1 | 26.3% | 39.1 | 1.81 |
| Comparative Example 1 | 22.9% | 29.9 | 4.42 |
| Comparative Example 2 | 25.3% | 19.8 | 2.83 |

What is claimed is:

1. A method of manufacturing a liquid crystal display element, comprising:

applying to a surface of one of display substrates each having a support and an electrode provided on one surface of the support, which surface has the electrode, a coating solution for a display layer in which one of liquid crystal drops and liquid crystal microcapsules is dispersed in a solution containing gelatin and a solvent, the gelatin, the solvent, and the one of the liquid crystal drops and the liquid crystal microcapsules being in an adjusted mix proportion, thereby forming a coating layer; and evaporating the solvent in the coating layer at a temperature equal to or higher than the freezing point of the gelatin to provide a display layer between the electrodes of the display substrates, wherein a coating portion is retained in an atmosphere of which the vapor pressure is the same as or close to the saturation vapor pressure of the solvent in a part or the total of time that the solvent is evaporated.

2. A method of manufacturing a liquid crystal display element according to claim 1, wherein vibration is applied to the coating layer in a part or the total of time that the solvent is evaporated.

3. A method of manufacturing a liquid crystal display element according to claim 1, wherein the one of the liquid crystal drops and the liquid crystal microcapsules is prepared by a film-emulsifying process.

4. A method of manufacturing a liquid crystal display element according to claim 1, wherein a ratio $A_L$ of an area covered by the one of the liquid crystal drops and the liquid crystal microcapsules to a coated area, calculated by the following formula (1), is adjusted to a range of the following formula (2), when a ratio of volume of nonvolatile components to volume of the coating solution for the display layer is denoted as Sr, a ratio of volume of the one of the liquid crystal drops and the liquid crystal microcapsules to volume of the nonvolatile components is denoted as Lr, an average particle diameter of the one of the liquid crystal drops and the liquid crystal microcapsule is denoted as $D_L$ μm, and a wet coating thickness on the one of the display substrates is denoted as $t_w$ μm $$A_L = (3/2) \cdot (t_w \cdot Sr \cdot Lr / D_L) \quad \text{Formula (1)}$$

$$0.8 < A_L < 1.0 \quad \text{Formula (2)}.$$

5. A method of manufacturing a liquid crystal display element according to claim 4, wherein the ratio Lr of volume of the one of the liquid crystal drops and the liquid crystal microcapsules to volume of the nonvolatile components is adjusted to 0.9 or less.

6. A method of manufacturing a liquid crystal display element according to claim 1, wherein the temperature of the coating solution for the display layer is adjusted to a range of 40 to 60° C.

7. A method of manufacturing a liquid crystal display element according to claim 1, wherein the coating layer is dried at a temperature in a range of 40 to 60° C.

* * * * *